(12) United States Patent
Yuan et al.

(10) Patent No.: US 11,741,325 B1
(45) Date of Patent: Aug. 29, 2023

(54) PRINTING INK CONSUMPTION ESTIMATION

(71) Applicant: VMware, Inc., Palo Alto, CA (US)

(72) Inventors: Hui Yuan, Beijing (CN); Kun Shi, Beijing (CN); Lingjun Kong, Beijing (CN); Mangui She, Beijing (CN); Hui Zhang, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/880,401

(22) Filed: Aug. 3, 2022

(30) Foreign Application Priority Data

Jun. 16, 2022 (WO) ................ PCT/CN2022/099080

(51) Int. Cl.
| | | |
|---|---|---|
| *G06K 15/00* | (2006.01) | |
| *G06K 15/02* | (2006.01) | |
| *G06F 3/12* | (2006.01) | |
| *G06K 15/10* | (2006.01) | |

(52) U.S. Cl.
CPC ......... *G06K 15/4075* (2013.01); *G06F 3/121* (2013.01); *G06F 3/1256* (2013.01); *G06K 15/102* (2013.01); *G06K 15/1823* (2013.01); *G06K 15/1878* (2013.01)

(58) Field of Classification Search
CPC ............ G06K 15/4075; G06K 15/102; G06K 15/1823; G06K 15/1878; G06F 3/121; G06F 3/1256
See application file for complete search history.

(56) References Cited

U.S. PATENT DOCUMENTS

| | | |
|---|---|---|
| 7,869,083 B1 | 1/2011 | Vanderhye |
| 9,158,480 B2 | 10/2015 | Fernandes et al. |
| 2003/0002060 A1* | 1/2003 | Yokoyama ............... H04N 1/56 358/1.9 |
| 2003/0043392 A1 | 3/2003 | Sugimoto |
| 2005/0018230 A1 | 1/2005 | Green et al. |
| 2006/0050321 A1 | 3/2006 | Takahashi |
| 2011/0075196 A1 | 3/2011 | Cogan |
| 2012/0069361 A1 | 3/2012 | Jung et al. |
| 2014/0285494 A1 | 9/2014 | Jo et al. |
| 2015/0131126 A1 | 5/2015 | Daniels et al. |
| 2015/0186084 A1 | 7/2015 | Bradshaw |
| 2015/0234625 A1* | 8/2015 | Varga .................... G06F 3/1219 358/1.18 |
| 2015/0261479 A1 | 9/2015 | Park et al. |
| 2016/0041796 A1 | 2/2016 | Cho et al. |
| 2022/0256055 A1 | 8/2022 | Matsuda |

\* cited by examiner

*Primary Examiner* — Quang N Vo
(74) *Attorney, Agent, or Firm* — SU IP CONSULTING

(57) ABSTRACT

Example methods and systems for printing ink consumption estimation are described. In one example, a computer system may obtain printing content associated with a document that is printable using a printer. Based on the printing content, the computer system may generate an image representation of the document, wherein the image representation includes an array of multiple pixels associated with first color information from a first color space. Color conversion may be performed by converting (a) the first color information from the first color space to (b) second color information from a second color space associated with the printer. The computer system may estimate an amount of printing ink required for printing the document based on the second color information and provide the estimated amount of printing ink to a user via a user interface.

21 Claims, 17 Drawing Sheets

| | SRC(DPI=600) | TGT(DPI=300) | INK SAVINGS |
|---|---|---|---|
| K_TOTAL | 415371.25 | 111335.56 | 73.2% |
| C_TOTAL | 127342.95 | 49316.71 | 61.3% |
| M_TOTAL | 240200.45 | 84571.46 | 64.8% |
| Y_TOTAL | 223128.39 | 75471.08 | 66.2% |
| I | 1006043.05 | 320694.80 | 68.1% |

1640

| | SRC | TGT | INK SAVINGS |
|---|---|---|---|
| K_TOTAL | 8893614 | 703969 | 92.08% |
| C_TOTAL | 10950660 | 5177913 | 52.72% |
| M_TOTAL | 10453075 | 5175713 | 50.49% |
| Y_TOTAL | 10342763 | 5135722 | 50.34% |
| I | 40640112 | 16193316 | 60.15% |

1670

PRINTING INK CONSUMPTION ESTIMATION

CROSS REFERENCE TO RELATED APPLICATIONS

The present application claims the benefit of Patent Cooperation Treaty (PCT) Application No. PCT/CN2022/099080, filed Jun. 16, 2022. The present application is related in subject matter to Patent Application Ser. No. 17/880,368 and Ser. No. 17/880,381. The aforementioned patent applications are incorporated herein by reference.

BACKGROUND

As the cost of printing increases, users may prefer to reduce printing ink consumption. One conventional approach is a user modifying the content of a document to be printed manually, such as by deleting words and adjusting paragraph settings to reduce the number of pages in the document, reducing the number of images, etc. Another conventional approach is the user adjusting print settings manually, such as duplex (i.e., double sided) printing, multiple pages per sheet of paper, reducing print scale (e.g., 75% instead of full scale), monochrome instead of color printing, etc. In practice, these manual adjustments might be inconvenient and time consuming for users.

DETAILED DESCRIPTION

Figure 1:
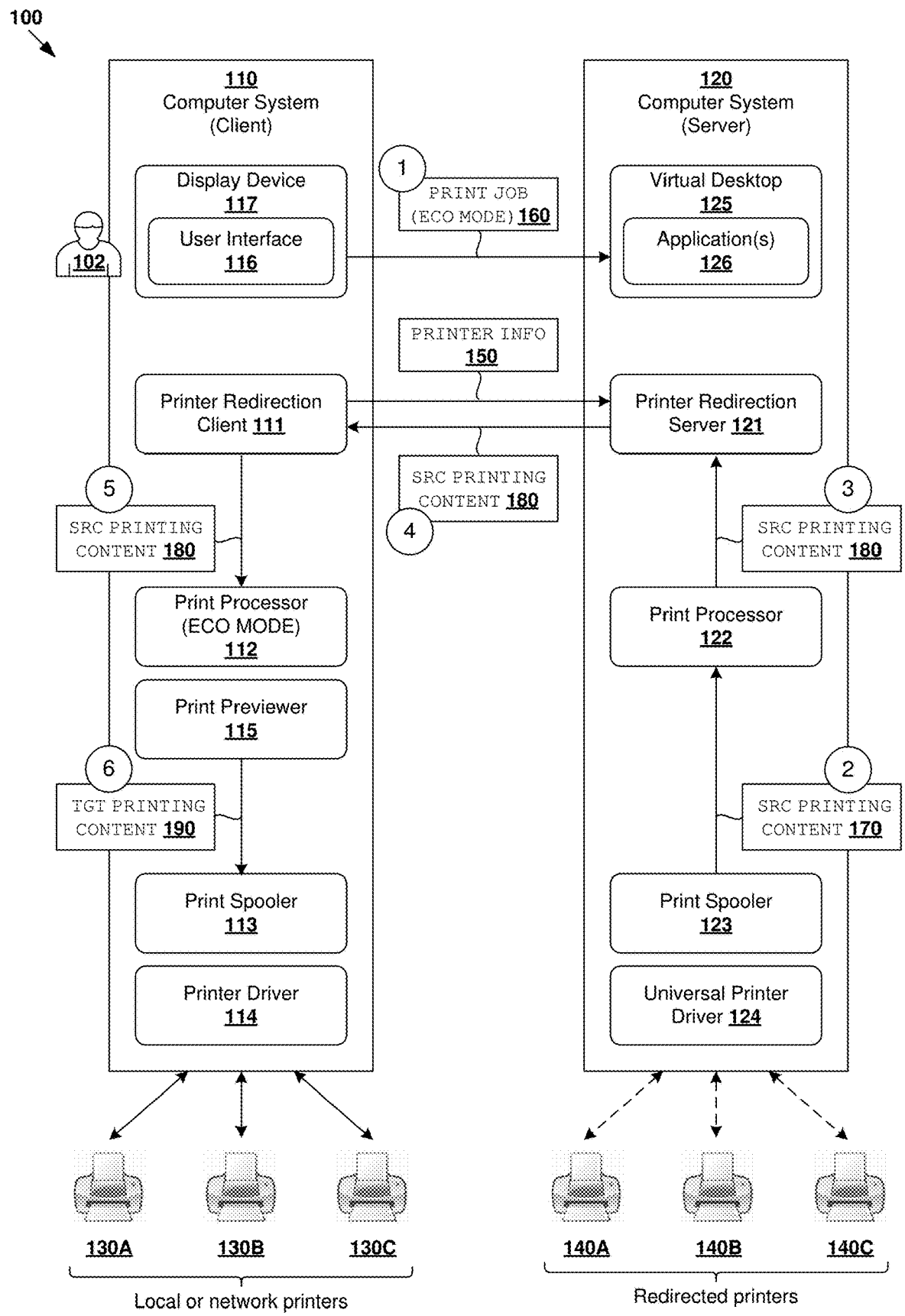
FIG. 1 is a schematic diagram illustrating an example network environment in which an economic printing mode may be implemented.

According to a first aspect of the present disclosure, method(s) and system(s) for implementing an economic printing mode are described. In one example, a computer system (e.g., 110 in FIG. 1) may provide a user interface specifying multiple selectable levels associated with the economic printing mode. The multiple selectable levels include one or more of the following: (a) a first level associated with print quality, (b) a second level associated with image information and (c) a third level associated with textual information. The computer system may transform source printing content (e.g., 180 in FIG. 1) to generate target printing content (e.g., 190 in FIG. 1) that is printable using a lower ink consumption compared to the source printing content.

The transformation may include one or more of the following. In a first example, in response to detecting a selection of the first level via the user interface, the target printing content may be generated by reducing print quality. In a second example, in response to detecting a selection of the second level via the user interface, the target printing content may be generated by modifying image information in the source printing content. In a third example, in response to detecting a selection of the third level via the user interface, the target printing content may be generated by modifying textual information in the source printing content. The computer system may provide the target printing content to the printer for printing or generate a preview of the target printing content prior to printing, or both. Various examples will be discussed below using FIGS. 1-11.

According to a second aspect of the present disclosure, method(s) and system(s) for implementing an economic printing mode with font information modification are described. In one example, a computer system (e.g., 110 in FIG. 1) may obtain source printing content associated with a print job that is destined for a printer and the economic printing mode may be selected for the print job. The computer system may extract, from the source printing content, (a) textual information to be printed and (b) font information associated with the textual information. The source printing content may be transformed to generate target printing content that is printable using a lower ink consumption compared to the source printing content by modifying the font information associated with the textual information. The computer system may provide the target printing content that includes modified font information to the printer for printing and/or generate a preview of the target printing content prior to printing using the printer. Various examples will be discussed below using FIGS. 1-5, 9-11.

According to a third aspect of the present disclosure, method(s) and system(s) for printing ink consumption estimation are described. In one example, a computer system (e.g., 110 in FIG. 1) may obtain printing content associated with a document that is printable using a printer. Based on the printing content, the computer system may generate an image representation of the document, wherein the image representation includes an array of multiple pixels associated with first color information from a first color space. Color conversion may be performed by converting (a) the first color information from the first color space to (b) second color information from a second color space associated with the printer. The computer system may estimate an amount of printing ink required for printing the document based on the second color information and provide the estimated amount of printing ink to a user via a user interface. Various examples will be discussed below using FIGS. 12-16.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

FIG. 1 is a schematic diagram illustrating example network environment 100 in which economic printing mode may be implemented. Depending on the desired implementation, network environment 100 may include additional and/or alternative components than that shown in FIG. 1. Here, network environment 100 may include first computer system 110 (e.g., client) that is connected with second computer system 120 (e.g., server) over a physical network (not shown for simplicity). In one example, virtual desktop infrastructure (VDI) technology may be implemented in network environment 100. In this case, computer system 110 may include any suitable software and/or hardware to facilitate user's 102 remote access to virtual desktop 125, which may be implemented using one or more virtual machines (VMs) supported by server 120. Through virtual desktop 125, user 102 may access various applications, such as word processing application, web browser, email application, videoconferencing application, etc. Example VMs will be discussed further using FIG. 17.

For printing purposes, computer system 110 may be connected to multiple physical local or network printers, including printers 130A-C. To enable user 102 to print from virtual desktop 125 to any of printers 130A-C, computer system 110 and server 120 may include corresponding client-server components. On the client side, computer system 110 may include printer redirection client 111, print processor 112 capable of implementing an economic mode (to be described further below), print previewer 115, print spooler 113 and printer driver 114. On the server side, server 120 may include printer redirection server 121, print processor 122, print spooler 123 and universal printer driver 124.

When computer system 110 establishes a connection with server 120, configuration information may be sent to server 120, including information associated with printers 130A-C (see 150 in FIG. 1). Based on the configuration information, server 120 may configure virtual printers 140A-C that correspond with respective physical printers 130A-C. Universal printer driver 124 on server 120 may be configured to support various printer types and/or native printer driver(s) may be installed. This way, printer redirection may be performed to enable user 102 to send a print job from virtual desktop 125 running on server 120 to one of printers 130A-C connected to computer system 110. In practice, printing from virtual desktop 125 or virtual application(s) 126 is known as virtual printing.

Printer redirection may be implemented using any suitable approach, such as using VMware® Integrated Printing (VIP) solution, etc. For example, on the client side, user 102 may interact with user interface 116 on display device 117 to initiate a print job (see 160 in FIG. 1) to print a document using target printer 130A. For example, the print job may be initiated using a word processing application supported by virtual desktop 125. In response, print spooler 123 on the server side may generate printing content (referred to as "source printing content"), which is then processed by print processor 122 (see 170-180 in FIG. 1). Any suitable processing may be performed by print processor 122, such as adding watermark(s) to source printing content 170 to extend printer's capability, etc. Source printing content 180 is then sent from print redirection server 121 towards print redirection client 111.

On the client side, print redirection client 111 may receive and direct source printing content 180 towards print processor 112 capable of implementing an economic printing mode according to examples of the present disclosure. Using the economic printing mode, source printing content 180 may be transformed into target printing content 190 that requires a comparatively lower ink consumption. In practice, a default print choice may be configured to either print directly using one of printers 130A-C or generate a print preview before printing. When print preview is selected by user 102, print previewer 115 may generate a print preview for review prior to printing by target printer 130A. Print processor 112 and/or print previewer 115 may in turn send target printing content 190 to printer 130A for printing.

Economic Printing Mode

According to examples of the present disclosure, an economic printing mode may be implemented to reduce printing ink consumption. Examples of the present disclosure may be implemented using any suitable "computer system" that is connected to at least one printer, such as client computer system 110 in FIG. 1. Although described using virtual desktop(s) and virtual printing as examples, examples of the present disclosure may be implemented using any computer system, including a standalone system that is connected to at least one physical printer.

Figure 2:
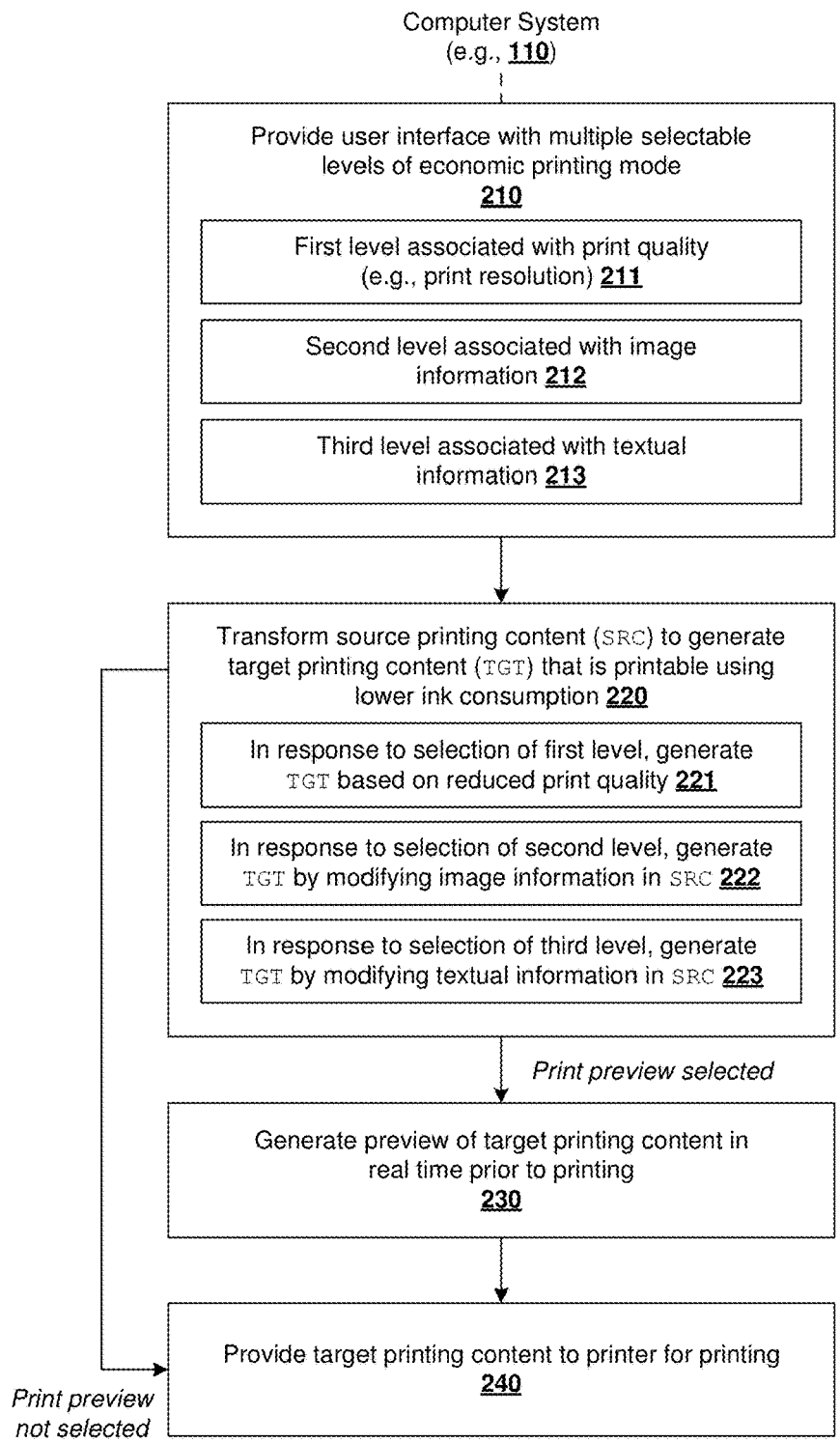
FIG. 2 is a flowchart of an example process for a computer system to implement an economic printing mode.

Throughout the present disclosure, the term "economic printing mode" may refer generally to a mode of operation to economize on printing ink consumption by transforming source printing content into target printing content that is printable using a lower ink consumption compared to the source printing content. Examples of the present disclosure may be implemented to transform the source printing content automatically without necessitating a user to perform manual adjustment(s) to a document to be printed. In more detail, FIG. 2 is a flowchart of example process 200 for a computer system to implement an economic printing mode. Example process 200 may include one or more operations, functions, or actions illustrated by one or more blocks, such as 210 to 240. Depending on the desired implementation, various blocks may be combined into fewer blocks, divided into additional blocks, and/or eliminated.

At 210 in FIG. 2, computer system 110 may provide a user interface specifying multiple selectable levels of an economic printing mode. For example, the user interface may specify multiple selectable levels that include one or more of the following: (a) a first level associated with print quality, (b) a second level associated with image information and (c) a third level associated with textual information. The selectable levels may represent optimization levels associated with the economic printing mode. See 211-213 in FIG. 1.

As used herein, the term "user interface" may be refer generally to any suitable interface that is presentable to a user for input and selection of one of the multiple levels. For example in FIG. 1, user interface 116 that is displayed on display device 117 (e.g., monitor) may include one or more graphical user interfaces (GUIs) that includes various elements to facilitate a user's selection. Example user interface elements may include checkbox(es), button(s), window(s), tab(s), list(s), dropdown list(s), any combination thereof, etc. Other suitable user interfaces may include command line interface (CLI), application programming interface (API), etc.

At 220 in FIG. 2, based on a user's selection, computer system 110 may transform source printing content (e.g., 180 in FIG. 1) to generate target printing content (e.g., 190 in FIG. 1) that is printable using a lower ink consumption compared to the source printing content. Here, the term "source printing content" may refer generally to printing content prior to transformation associated with the economic printing mode, and "target printing content" to printing content after the transformation. As will be explained below, the source/target printing content may include any spool (SPL) file information, spool shadow (SHD) file information, etc.

For example, the SPL file information may include spooled information in any suitable format, such as enhanced metafile (EMF), etc. In practice, EMF and RAW are spool file formats used in printing by operating systems such as Microsoft Windows®, etc. EMF is a file format that may be used to store portable (i.e., device-independent) representations of images. Further, the SHD file information may include information associated with print job settings, such as printer name, document name, a copy of a DEVMODE structure, etc. The SHD file information is usually created alongside the SPL file information.

Any suitable transformation may be performed at block 220. For example, at 221, in response to detecting a selection of the first level via the user interface, the target printing content may be generated by reducing print quality, such as using a lower print resolution. At 222, in response to detecting a selection of the second level via the user interface, the target printing content may be generated by modifying image information in the source printing content. At 223, in response to detecting a selection of the third level via the user interface, the target printing content may be generated by modifying font information associated with textual information in the source printing content.

In practice, print quality may be measured using any suitable parameter, such as print resolution. As used herein, the term "print resolution" may refer generally the density of ink dots that can be printed across a printing substrate within a defined length, such as the number of dots per inch (DPI) used in ink jet printing technology. The term "image information" should be interpreted broadly to encompass a variety of still images (e.g., photographs), graphics objects, or other types of visual representations. Example graphics objects may include drawings (e.g., created using pen and/or brush), shapes (e.g., boxes, lines, etc.), and charts (e.g., bar charts, histograms, etc.) that are either computer-generated or drawn by user 102 using any suitable application. The term "textual information" may refer generally to text characters or strings, such as letters, numbers, words, sentences, punctuations, symbols, equations, etc.

At 230-240 in FIG. 2, computer system 110 may provide target printing content 190 to printer 130A for printing and/or generate a preview of target printing content 190 in real time prior to printing using printer 130A. In the example in FIG. 1, the preview may be generated using print previewer 115. Through automatic transformation of source printing content 180 based on selectable level(s) of the economic printing mode, target printing content 190 may be printed using a lower ink consumption compared to source printing content 180. Various examples of the economic printing mode will be discussed below.

First Level: Print Quality Reduction

Figure 3:
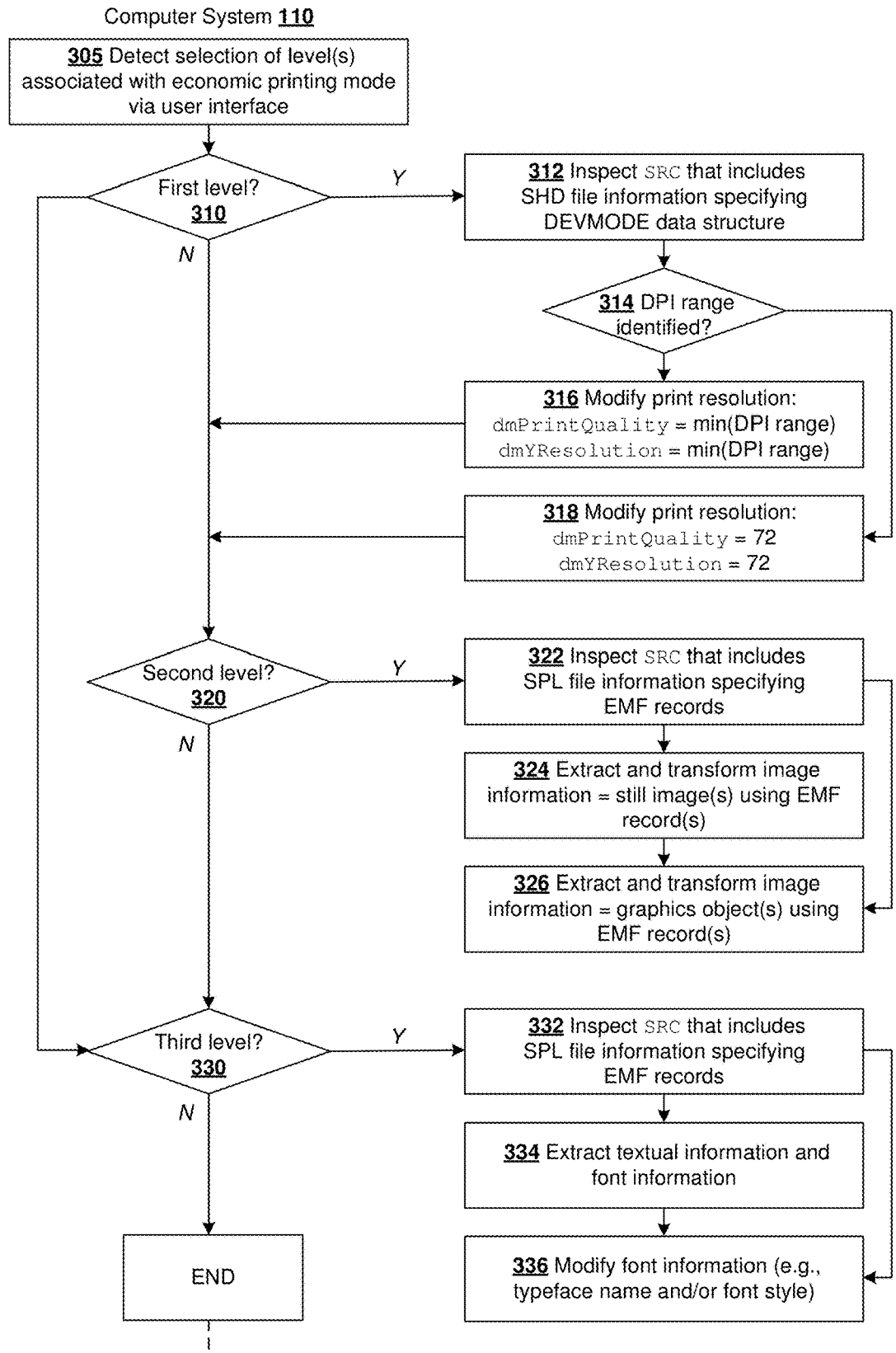
FIG. 3 is a flowchart of an example detailed process for a computer system to implement an economic printing mode.

FIG. 3 is a flowchart of example detailed process 300 for a computer system to implement economic printing mode. Example process 300 may include one or more operations, functions, or actions illustrated by one or more blocks, such as 310 to 336. Depending on the desired implementation, various blocks may be combined into fewer blocks, divided into additional blocks, and/or eliminated. Some examples will be described using FIG. 4, which is a schematic diagram illustrating example transformations of source printing content into target printing content. Note that example user interface 410 includes a "Print with Full Quality" option for user 102 to disable the economic printing mode.

At 305 in FIG. 3, computer system 110 may detect a user's selection of an economic printing mode to print source printing content using printer 130A. For example in FIG. 4, example user interface 410 may specify multiple selectable levels associated with the economic printing mode. At 411, a first level is associated with print quality. At 412, a second level is associated with image information, such as still image(s), graphics object(s), etc. At 413, a third level is associated with textual information, such as font style, typeface name, etc. See 420 in FIG. 2.

At 310-312 in FIG. 3, in response to detecting a selection of first level 411 via user interface 410 (i.e., "Modify Print Quality" selected), computer system 110 may inspect source printing content that includes SHD file information, which is usually generated alongside SPL file information associated with a print job. The SHD file information may be inspected to determine the capability of printer 130A, such as to identify its DPI range. At 314-316, in response to identifying the DPI range, computer system 110 may modify a print resolution associated with printer 130A to be the minimum DPI value from the range of DPIs. Otherwise (i.e., DPI range not known), at 318, the print resolution is modified to be a predetermined value, such as 72 DPI.

Figure 4:
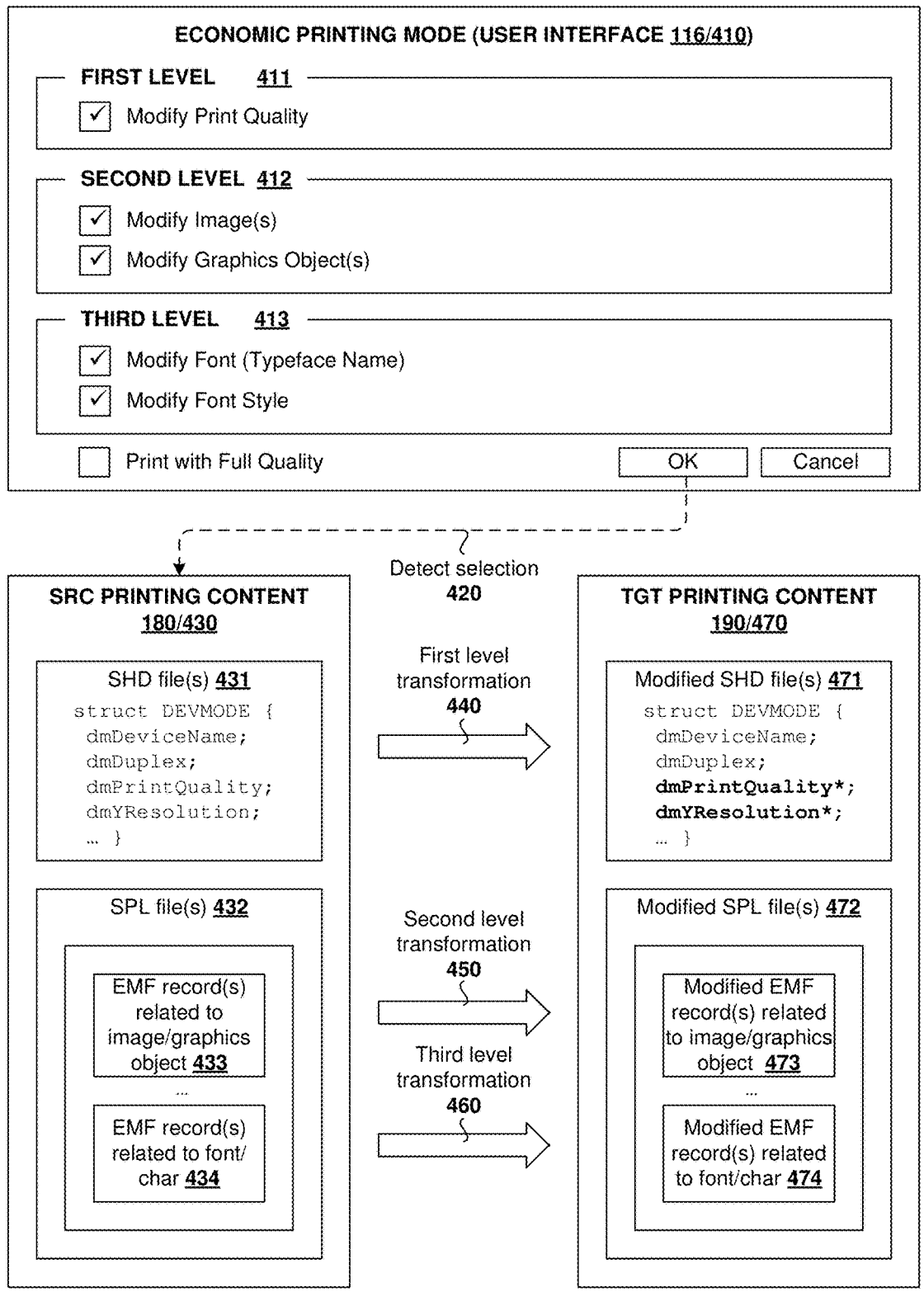
FIG. 4 is a schematic diagram illustrating example transformations of source printing content into target printing content.

In the example in FIG. 4, source printing content 430 (see 180 in FIG. 1) may be transformed into target printing content 470 (see 190 in FIG. 1) based on user's 102 selection of one or more levels 411-413. Here, source printing content 430 may include SHD file information 431 and SPL file information 432. SHD file information 431 may include a data structure called DEVMODE that stores information associated with the initialization and environment of a printer. Example members of the DEVMODE data structure include dmDeviceName=name of device, dmOrientation= paper orientation, dmPaperSize=paper size, dmDuplex= single-sided (i.e., non-duplex) or double-sided (i.e., duplex) printing, dmColor=color or monochrome, etc.

In relation to print resolution, the DEVMODE data structure includes dmPrintQuality=x-resolution in DPI of the printer, dmYResolution=y-resolution in DPI of the printer. In this case, block 316 may involve setting (a) dmPrintQuality=minimum of range of x-resolution values in DPI and (b) dmYResolution=minimum of range of y-resolution values in DPI as supported by target printer 130A. Otherwise, a predetermined value may be used at block 318 instead, such as (a) dmPrintQuality=72 DPI and (b) dmYResolution=72 DPI.

In the example in FIG. 4, after first level transformation 440 is performed, target printing content 470 may include modified SHD file information 471. In particular, the DEVMODE data structure may include updated (dmPrintQuality, dmYResolution) to instruct printer 130A to print using a reduced print quality. In practice, 72 DPI is usually sufficient to produce a substantially decipherable or legible printing outcome. In practice, most printers may be configured with a print resolution that ranges between 300 DPI and 600 DPI, if not higher. As such, the print resolution may be reduced to 72 DPI or a minimum of that range (e.g., 300 DPI) reduce ink consumption. Note that any other reduced DPI may be configured, and it is not necessary to set the print quality to 72 DPI specifically.

Second Level: Image Information Transformation

At 320-322 in FIG. 3, in response to detecting a selection of a second level associated with image information, computer system 110 may inspect the source printing content that includes SPL file information, such as in EMF format. At 324-326, computer system 110 may generate target printing content by identifying and transforming image information in the source printing content, such as still image(s), graphics object(s), etc. Using EMF as an example, blocks 324-326 may involve inspecting and modifying EMF record(s) associated with the image information.

As will be described further below, the structure of the EMF format may include a sequence of variable-length records that include drawing commands, object definitions, and graphics properties to render a graphical image on any output device. Different EMF records may have different attributes, the values of which are defined using data within the EMF content. In the example in FIG. 4, after second level transformation 450 is performed, target printing content 471 may include modified SPL file information 472. In particular, EMF record(s) associated with image information may be modified to transform still image(s) and/or graphics object(s) to reduce ink consumption. See 433 and 473 in FIG. 4.

(a) Example EMF Records

Some example EMF records will be discussed using FIG. 5, which is a schematic diagram illustrating example structure 500 of EMF format. In practice, EMF is the Windows® format for rendering a print job. As a 32-bit version of the original Windows metafile (WMF) format, EMF was introduced in the early 1990s to solve deficiencies of the WMF format. EMF content is designed to be portable between applications. When an EMF metafile is "played back" on a specific device, the resulting image or graphics object maintains the same dimensions, shape, proportions, color, and so on, as the original.

Figure 5:
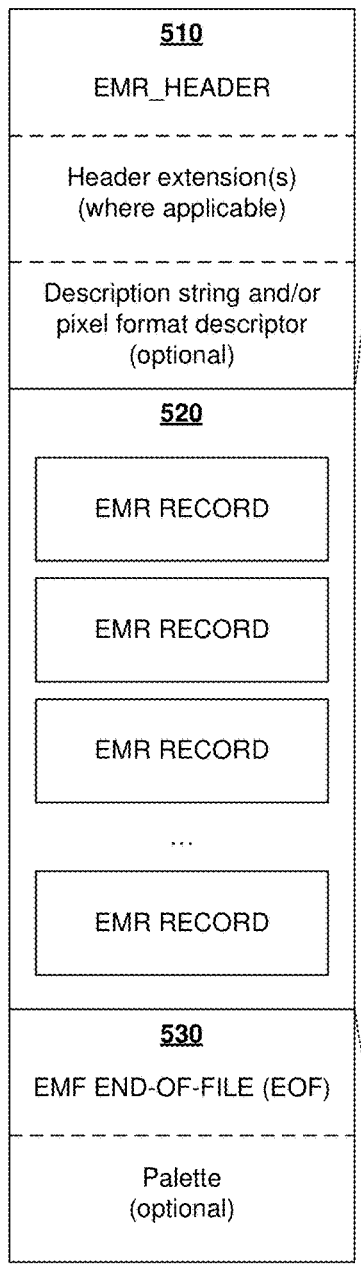
FIG. 5 is a schematic diagram illustrating an example structure of enhanced metafile (EMF) format.

In the example in FIG. 5, an EMF metafile may include EMF header record 510, EMF record(s) 520, EMF end-of-file (EOF) record 530 and an optional palette. At 510, the EMF header record may specify information associated with the structure and contents of the metafile, including an optional description string and pixel format descriptor. At 520, the EMF record(s) may specify a sequence of drawing orders, property settings and object definitions. At 530, the EMF EOF record is the last record in the EMF metafile. In practice, any suitable version the EMF metafile may be used, such as original, extension 1 (with added pixel format record and support for OpenGL commands) and extension 2 (with enhanced accuracy and scalability), etc.

At 540 in FIG. 5, some example bitmap record types associated with image information are shown. The bitmap record types may specify a block transfer of pixels from a source bitmap to a destination rectangle, such as EMR_ALPHABLEND (includes alpha transparency), EMR_BITBLT (includes brush pattern), EMR_MASKBLT (includes application of a color mask bitmap), EMR_PLGBLT (destination parallelogram, with the application of a color mask bitmap), EMR_SETDIBITSTODEVICE (block transfers from specified scanlines of a source bitmap), EMR_STRETCHBLT and EMR_STRETCHDIBITS (stretching or compressing output to fit dimensions of the destination, if necessary), EMR_TRANSPARENTBLT (treating a specified color as transparent), etc.

At 550 in FIG. 5, an example brush record type is shown. Here, the EMR_CREATEBRUSHINDIRECT record may define a logical brush for graphics operations. The brush record may include type (i.e., a value that identifies the record as EMR_CREATEBRUSHINDIRECT), size (i.e., size of record), ihbrush (i.e., unsigned integer specifying the index of the logical brush object in an EMF object table) and logbrush object (i.e., specifies the style, color and pattern of the logical brush).

At 560 in FIG. 5, some example pen record types are shown. Here, the EMR_CREATEPEN record may define a logical pen for graphics operations, and include attributes such as ihPen=index of a logical pen object in an EMF object table, etc. The EMR_EXTCREATEPEN record may define an extended logical pen for graphics operations. The EMR_EXTCREATEPEN record may include attributes such as ihPen=index of an extended logical pen object in an EMF object table, etc.

At 570 in FIG. 5, some example graphics-related record types are shown. For example, the EMR_ANGLEARC, EMR_ARC and EMR_ARCTO records may specify an arc. Other records may be associated with various graphics objects, such as a chord (e.g., EMR_CHORD), an ellipse (e.g., EMR_ELLIPSE), Bezier curve(s) (e.g., EMR_POLYBEZIER16 and EMR_POLYBEZIERTO16), a set of Bezier curve(s) and line segments (e.g., EMR_POLYDRAW), polygon (e.g., EMR_POLYGON), pie-shaped object (e.g., EMR_PIE), line (e.g., EMR_LINETO), etc. A specified region may be painted using a current brush based on the EMR_PAINTRGN record or the region may be filled using the EMR_FILLRGN record.

In practice, graphics objects specified in an EMF file may be used by drawing and painting operations. They may be created by object creation records during the metafile playback and saved for later use. When needed, a graphics object may be retrieved and selected into a playback device context, such as using an EMR_SELECTOBJECT record, etc. The types of reusable objects may include brushes, color spaces, fonts, palettes, pens, etc.

(b) Still Image(s)

Block 324 in FIG. 3 will be discussed in detail below using FIG. 6, which is a flowchart of first example detailed process 600 for computer system 110 to implement an economic printing mode with image information transformation for still image(s). In this example, image(s) in input=source printing content (e.g., EMF content to be printed) may be transformed into output=target printing content (i.e., processed EMF content). Computer system 110 may perform image information in response to detecting a selection of the "Modify Image(s)" option through user's 102 interaction with user interface 410 in FIG. 4.

In relation to image transformation, any suitable EMF record types that are relevant to printing may be considered. One type includes a bitmap, which may be drawn directly. Another type does not include the bitmap, in which case a selected brush may be used to draw a temporary bitmap in memory for printing to a target printer. Both types may be inspected during image information transformation.

Figure 6:
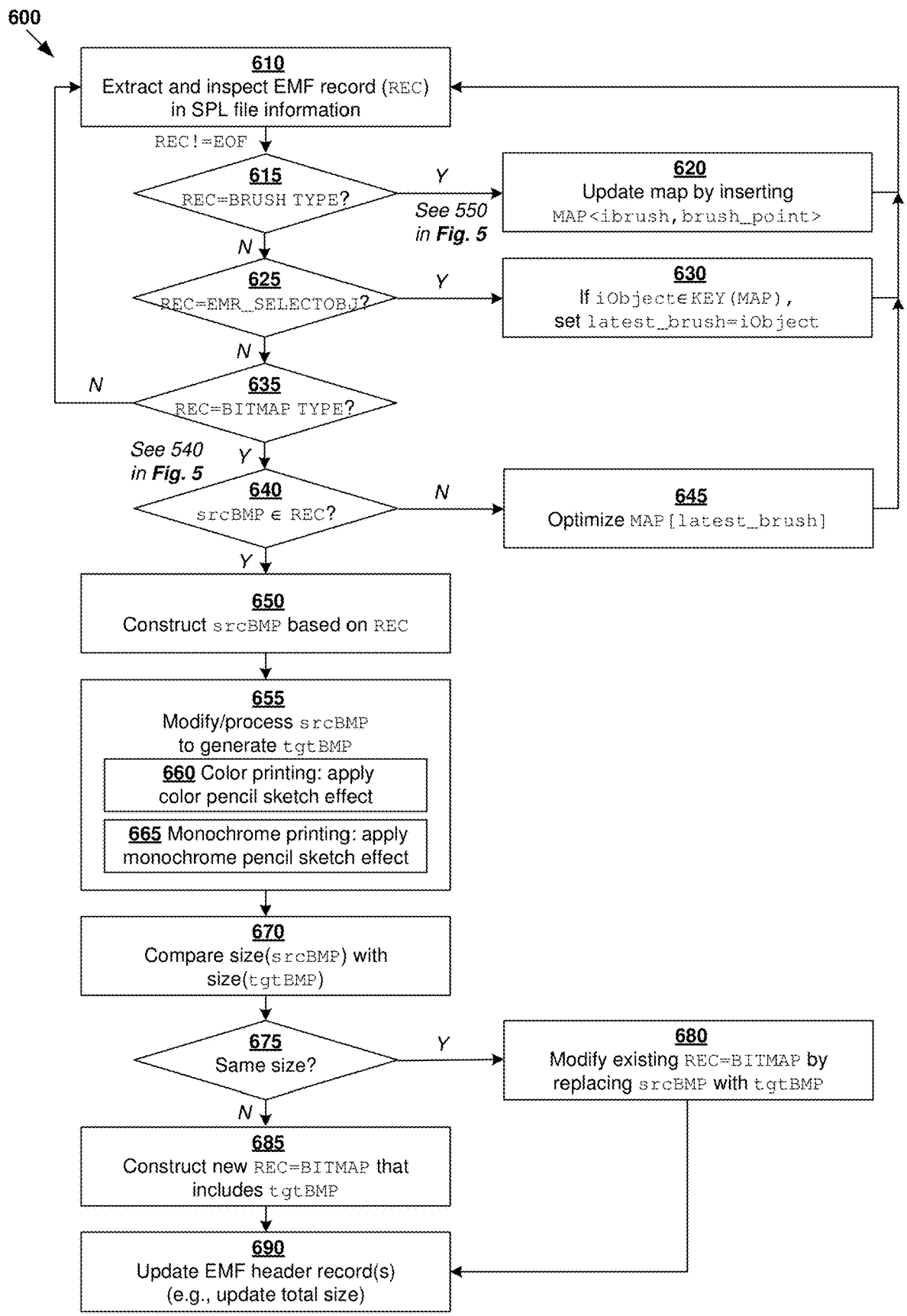
FIG. 6 is a flowchart of a first example detailed process for a computer system implement an economic printing mode with image information transformation for still image(s)

At 610-615 in FIG. 6, each source EMF record in the source printing content may be parsed to determine whether it is a brush record type, such as EMR_CREATEBRUSH-INDIRECT (see 550 in FIG. 5). At 620, if yes (i.e., brush record identified), a map (denoted as MAP) may be updated to include <ibrush, brush_point> associated with the brush record. Otherwise (i.e., not a brush record), block 625 may be performed to determine whether the source EMF record is an EMR_SELECTOBJECT record. At 630, record=EMR_SELECTOBJECT and there is an iObject in the map (see iObject∈KEY(MAP)), a latest_brush pointer is set to the iObject.

Otherwise (i.e., no at block 625), block 635 may be performed to determine whether the source EMF record=bitmap record (see examples at 540 in FIG. 5). If not, the next EMF record is inspected unless the EOF record is reached. At 640, in response to identifying source EMF record=bitmap record, it is determined whether the bitmap record includes a source bitmap. If yes, at 645, transformation may be performed to optimize MAP[latest_brush].

At 650-655 in FIG. 6, in response to determination that the source EMF record is a bitmap record that includes a source bitmap, a "playback" may be performed to construct and process the source bitmap, thereby transforming the source bitmap to a target (i.e., replacement) bitmap. For example, at 660, in response to determination that color printing is required, the target bitmap may be generated by applying a color pencil sketch effect on the source bitmap. Otherwise, at 665, in response to determination that color printing is not required, the target bitmap may be generated by applying a monochrome (i.e., black/white) pencil sketch effect on the source bitmap.

At 670-675 in FIG. 6, the size of the target bitmap (i.e., after pencil sketch effect is applied) may be compared with the size of the source bitmap. If they are of the same size, at 680, a modified EMF record may be generated by replacing the source bitmap in the source EMF record with the target bitmap. Otherwise, at 685, a target bitmap record may be generated by constructing a new bitmap record that includes the target bitmap. At 690, the EMF header may be updated, such as by modifying the size of the record depending on the transformation performed.

Figure 7:
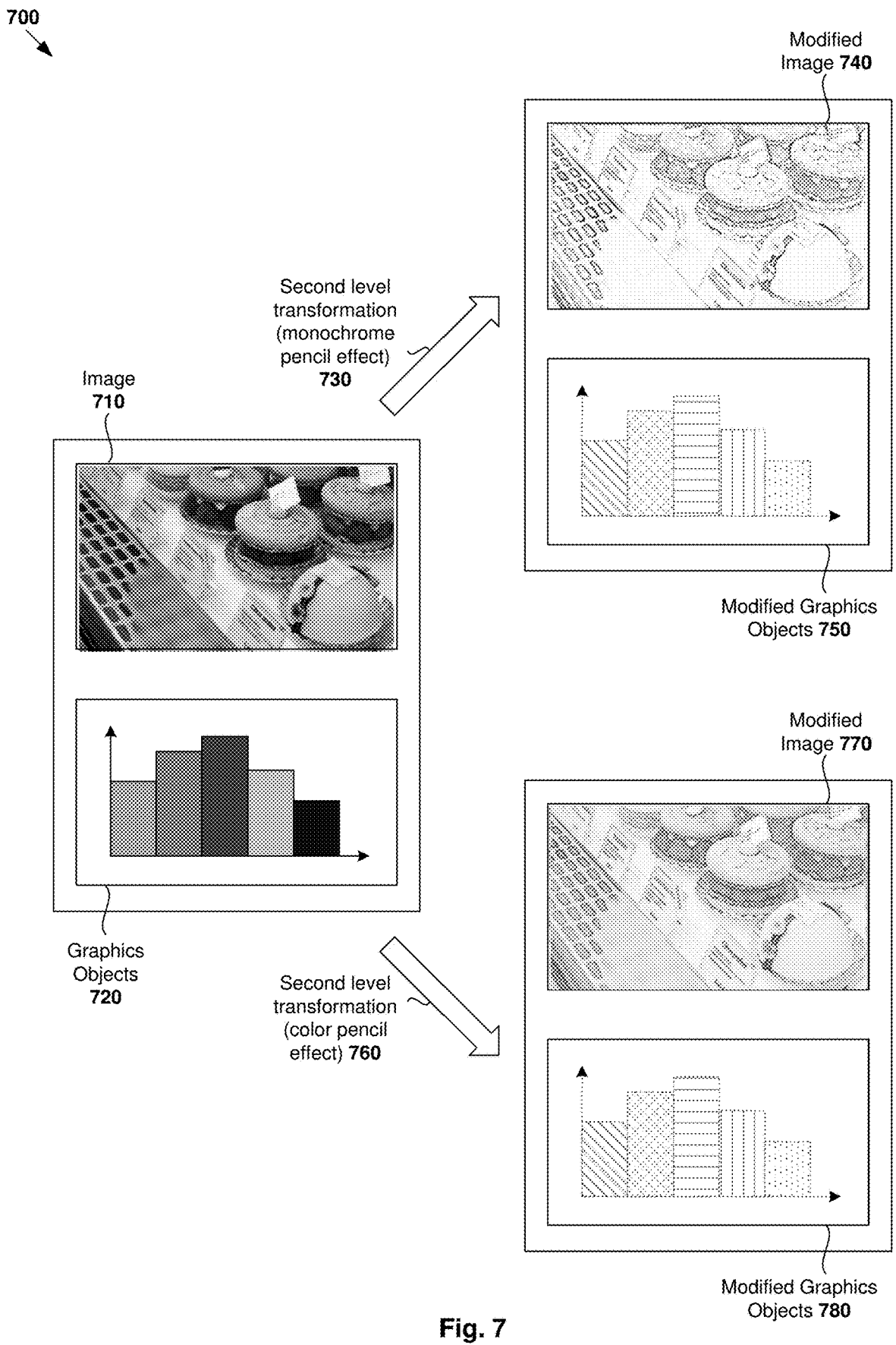
FIG. 7 is a schematic diagram illustrating example image information transformation according to the examples in FIG. 6 and FIG. 8.

Some examples are shown in FIG. 7, which is a schematic diagram illustrating example 600 of image information transformation. In this example, source printing content 610 may include image information that includes still image 710. At 730, in response to determination that color printing is not required, target printing content may be generated by applying a monochrome pencil sketch effect on original image 710 to generate first modified image 740. Otherwise, at 760, in response to determination that color printing is required, target printing content may be generated by applying a color pencil sketch effect on original image 710 to generate second modified image 770.

(c) Graphics Object(s)

Block 326 in FIG. 3 will be discussed in detail below using FIG. 8, which is a flowchart of second example detailed process 800 for computer system 110 to implement an economic printing mode with image information transformation for graphics object(s). Computer system 110 may perform image information in response to detecting a selection of the "Modify Graphics Object(s)" option through user's 102 interaction with user interface 410 in FIG. 4. In relation to graphics object transformation, relevant EMF record types may include brush (see 550 in FIG. 5), pen (see 560 in FIG. 5), graphics-related (see 570 in FIG. 5), etc. The example in FIG. 8 may include inspecting the source printing content to identify and modifying relevant EMF records to generate the target printing content.

Figure 8:
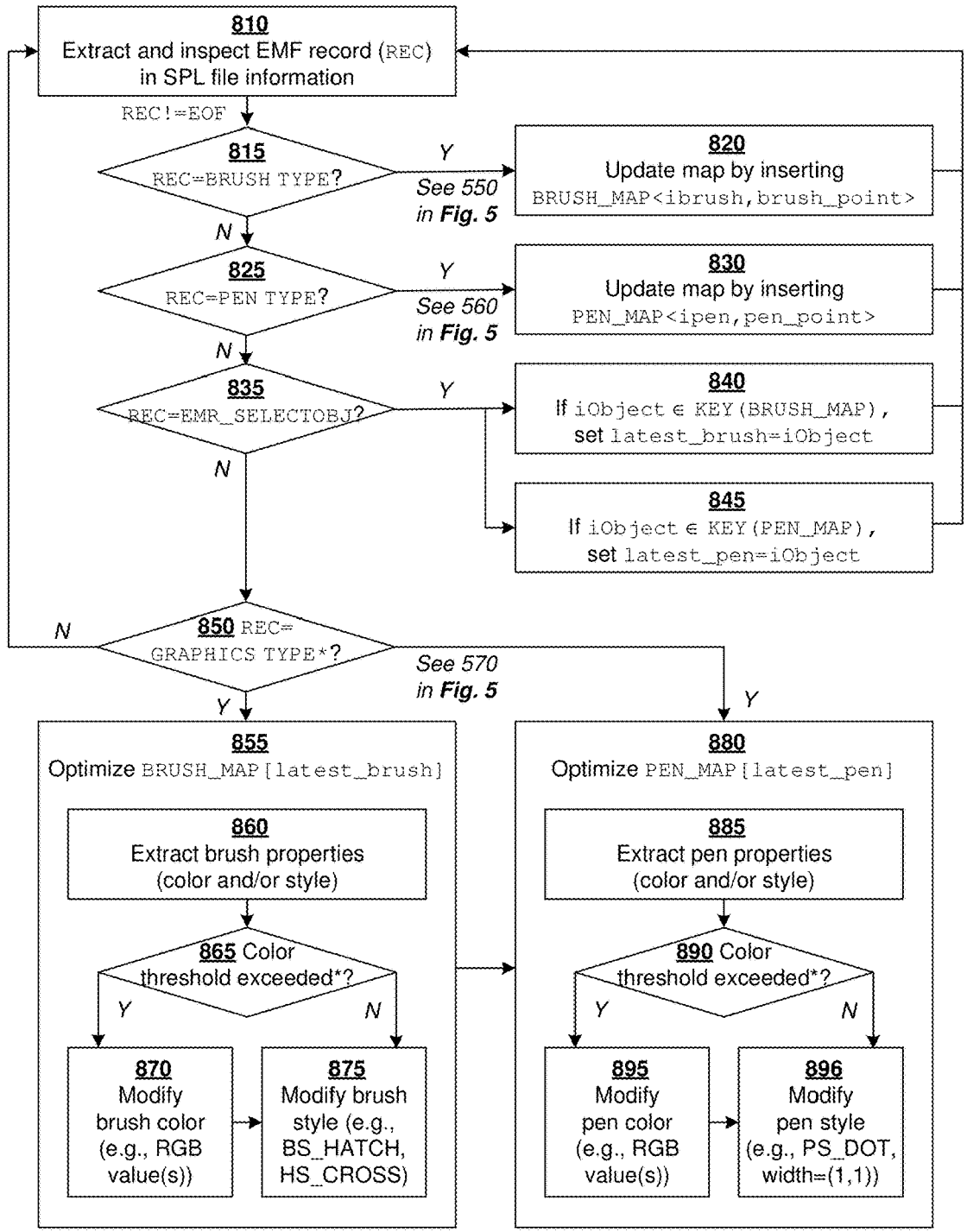
FIG. 8 is a flowchart of a second example detailed process for a computer system to implement an economic printing mode with image information transformation for graphics object(s)

At 810, 815 and 825 in FIG. 8, each EMF record in the source printing content may be inspected to determine whether it is a brush record or pen record. At 820, in response to identifying a brush record (e.g., EMR_CREATEBRUSHINDIRECT shown at 550 in FIG. 5), a brush map denoted as BRUSH_MAP may be updated to include <ibrush, brush_point> based on the brush record. At 830, in response to identifying a pen record (e.g., EMR_EXTCREATEPEN and EMR_CREATEPEN shown at 560 in FIG. 5), a pen map denoted as PEN_MAP may be updated to include <ipen, pen_point> based on the pen record.

At 835 in FIG. 8, in response to determination that the source EMF record is not a brush or pen record, it is determined whether the EMF record is an EMR_SELECTOBJECT record. At 840, in response to determination that EMF record=EMR_SELECTOBJECT and there is an iObject in the brush map (see iObject ∈ KEY(BRUSH_MAP)), a latest_brush pointer is set to the iObject in the brush map. Otherwise, at 845, in response to determination that EMF record=EMR_SELECTOBJECT and there is an iObject in the pen map (see iObject ∈ KEY(PEN_MAP)), a latest_brush pointer is set to the iObject in the pen map.

At 850 in FIG. 8, it is determined whether the EMF record is one of the graphics-related records shown at 570 in FIG. 5. If yes, transformation or modification may be performed by optimizing the brush map according to blocks 855-875 and/or pen map according to blocks 880-896 to reduce ink consumption. In both cases, for an RGB color space, less printing ink is required for a relatively higher RGB value compared to a lower value. For example, white=RGB(255, 255, 255) requires little or no ink to print compared to other colors such as blue=RGB(0, 0, 255) or black=RGB(0, 0, 0). The transformation below may involve modifying an RGB value of a brush record or pen record to reduce ink consumption.

An example of brush record transformation may be performed as follows. At 860 in FIG. 8, brush properties (e.g., color and/or style) may be retrieved and analyzed. At 860-870, in response to determination that a brush color property exceeds a threshold, the color property may be optimized by modifying its RGB value to reduce ink consumption. Any suitable threshold may be configured, such as RGB(200, 200, 200), etc. At 875, a brush style property may be modified to reduce ink consumption. For example, the modified brush style property may be brush style=BS_HATCHED and hatch style=HS_CROSS, etc. Here, BS_HATCHED is a brush style that paints a predefined simple pattern, or "hatch," onto a solid background. HS_CROSS is a hatch style may be used to specify horizontal or vertical cross-hatch.

An example of pen record transformation or modification may be performed as follows. At 875 in FIG. 8, pen properties (e.g., color and/or style) may be retrieved and analyzed. At 885-895, in response to determination that a pen color property exceeds a threshold (e.g., RGB(200, 200, 200)), the color property may be optimized by modifying its RGB value to reduce ink consumption. At 896, a pen style property may be modified to reduce ink consumption. For example, the modified pen style property may be pen style=PS_DOT to draw a dotted line and width=(1, 1). Compared to PS_SOLID that produces a solid line, less ink consumption is required for a dotted line. Other pen styles that require a lower ink consumption compared to PS_SOLID may include PS_DASH (to draw a dashed line), PS_DASHDOT (to draw a line with alternating dashes and dots), etc.

Referring to FIG. 7 again, an example graphics object transformation is shown. In this example, graphics object 720 in the form of a bar chart may be modified to reduce ink consumption. The results are shown at 750/780. Here, solid lines in original graphics object 720 are transformed into dotted lines. Further, rectangular bars with solid color are transformed into rectangular bars with patterns that reduce ink consumption during printing.

Third Level: Font Information Modification

Figure 9:
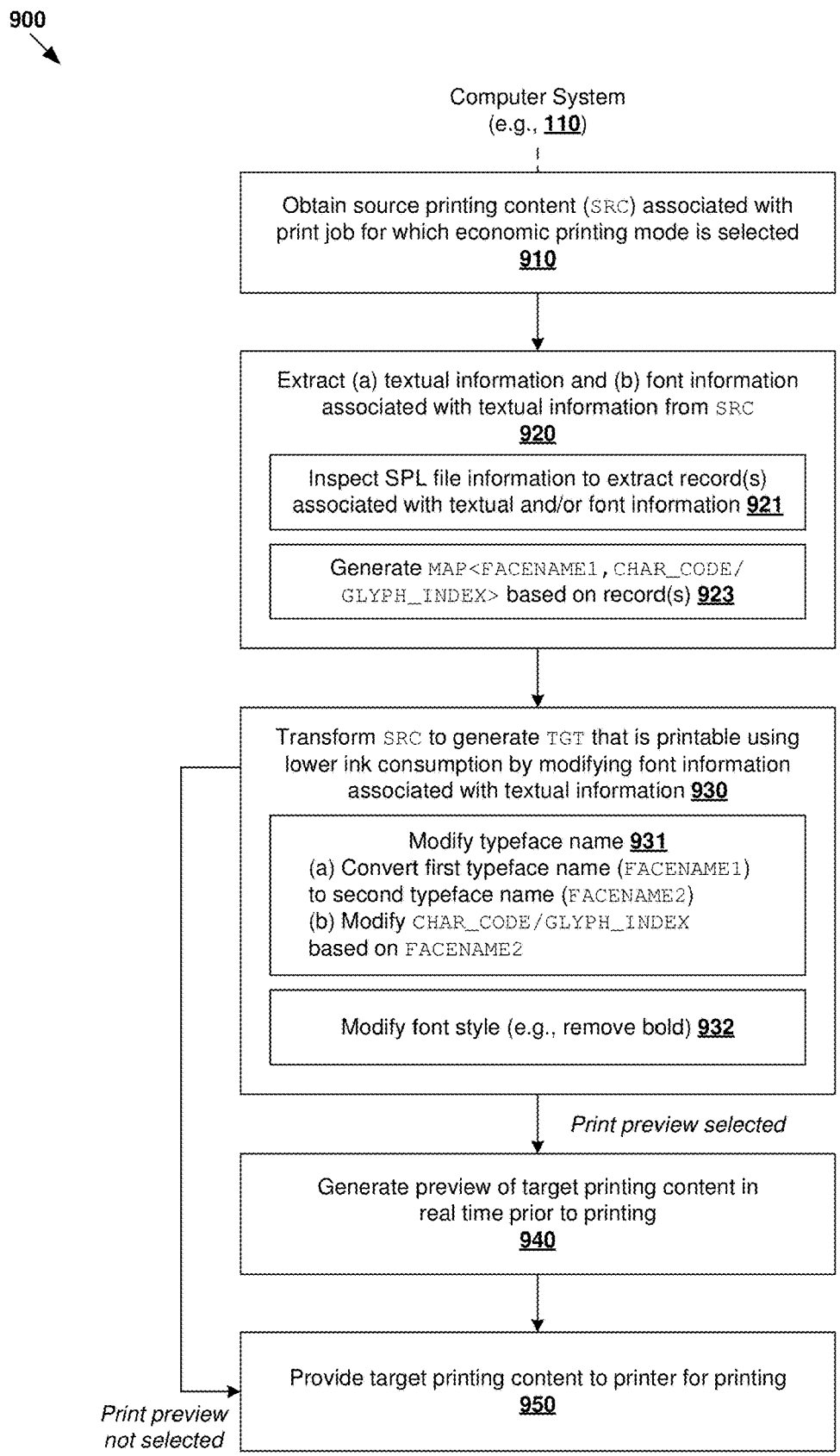
FIG. 9 is a flowchart of an example process for a computer system to implement an economic printing mode with font information modification.

FIG. 9 is a flowchart of example detailed process 900 for computer system 110 to implement economic printing mode with font information modification. Example process 900 may include one or more operations, functions, or actions illustrated by one or more blocks, such as 910 to 950. Depending on the desired implementation, various blocks may be combined into fewer blocks, divided into additional blocks, and/or eliminated. Blocks 910-950 in FIG. 9 (related to blocks 332-336 in FIG. 3) will be explained using the example in FIG. 4.

At 910 in FIG. 9, computer system 110 may obtain source printing content associated with a print job for which an economic printing mode is selected. Referring to FIG. 4 again, the economic printing mode may be selected via user interface 410, particularly third level 413 associated with font information modification. Depending on the desired information, computer system 110 may detect selection of "Modify Font (Typeface Name" and/or "Modify Font Style" through user's 102 interaction with user interface 410.

At 920 in FIG. 9, computer system 110 may extract, from the source printing content, (a) textual information to be printed and (b) font information associated with the textual information. For example in FIG. 4, source printing content 430 may include spool file information 432 in EMF format. In this case, block 920 may involve SPL file information 432 to extract EMF record(s) 434 associated with the textual information and/or font information, such as EMR_EXTTEXTOUTW/A, EMR_SMALLTEXTOUT, EMR_EXTCREATEFONTINDIRECTW, EMR_SELECTOBJECT, etc. These EMF record types will be described further below using FIG. 5.

At 930 in FIG. 9, computer system 110 may transform the source printing content to generate target printing content by modifying font information associated with the textual information. For example, block 931 may involve modifying a typeface name and/or font style associated with the textual information (see 931-932). This way, the target printing content may be printable using a lower ink consumption compared to the source printing content. In the example in FIG. 4 (see 460), target printing content 470 may include modified SPL file information 472 with modified EMF record(s) 474.

As will be described further below, block 920 may involve generating a map associating (a) the textual information that includes a set of character codes or glyph indexes with (b) the font information that includes a first typeface name associated with the set. Each entry in the map may be denoted as <FACENAME1, CHAR_CODE/GLYPH_INDEX>, where FACENAME1=first typeface name, and CHAR_CODE/GLYPH_INDEX=set of character codes or glyph indices using the first typeface name. In this case, block 931 may involve converting FACENAME1 to FACENAME2 (i.e., second typeface name) that requires a lower ink consumption compared to FACENAME1. Further, the set of character codes or glyph indexes may be modified based on FACENAME2.

At 940-950 in FIG. 9, computer system 110 may provide target printing content 470 that includes modified font information to printer 130A for printing and/or generate a preview of target printing content 470 in real time prior to printing using printer 130A. Through automatic font information modification of source printing content 430, target printing content 470 may be printed using a lower ink consumption. Various examples will be discussed below using FIGS. 10-11.

(a) Relevant EMF Records

Referring to FIG. 5 again, at 580-590, example EMF record types that are associated with textual information and/or font information may include the following: EMR_EXTTEXTOUTW/A, EMR_SMALLTEXTOUT, EMR_SELECTOBJECT and EMR_XTCREATEFONTINDIRECTW. They will be discussed in turn below.

The EMR_EXTTEXTOUTW record draws a Unicode text string using the current font, whereas the EMR_EXTTEXTOUTA record draws an ASCII text string using the current font (i.e., latest font that is selected into a device context). Attributes in the EMR_EXTTEXTOUTW/A record may include (Chars, fOptions, StringBuffer), where chars=number of characters in the string, fOptions=whether stored in characters or glyph indices, and stringBuffer stores values (characters or glyph indices) associated with the text string.

The EMR_SMALLTEXTOUT record outputs a text string. Attributes in the record may include (cChars, fuOptions, textString), where cChars specifies the number of 16-bit characters, fOptions indicates whether the text string is stored in character codes or glyph indices and textString stores values (character codes or glyph indices) associated with the text string. The EMR_SMALLTEXTOUT record also stores ETO_GLYPH_INDEX, which is a flag indicating that the character codes in an output text string are glyph indexes.

The EMR_SELECTOBJECT record selects an object into a playback device context. Attributes in the record may include iObject, which is an unsigned integer specifying either an index of the object in an EMF object table or the index of a stock object in an StockObject enumeration. The EMF object table may be used for managing objects during playback as the objects are created, activated, used, deactivated and deleted by the processing of EMF records.

The EMR_EXTCREATEFONTINDIRECTW record defines a logical font object that is selectable into a playback device context by an EMR_SELECTOBJECT record. Attributes in the EMR_EXTCREATEFONTINDIRECTW record may include (facename, ihFont), where facename=type face name associated with a logical font object and ihFont=unsigned integer that specifies the index of the logical font object in an EMF object table.

Depending on the desired implementation, a logical font object (e.g., LogFont Object in EMF) may specify attributes of a logical font, such as height, width, escapement, orientation, weight (e.g., from zero to 1000), italic font flag, underlined font flag, strikeout font flag, character set specifying a set of character glyphs, clip precision, output precision, facename specifying a typeface name of the font, etc.

(b) Typeface Name

Figure 10:
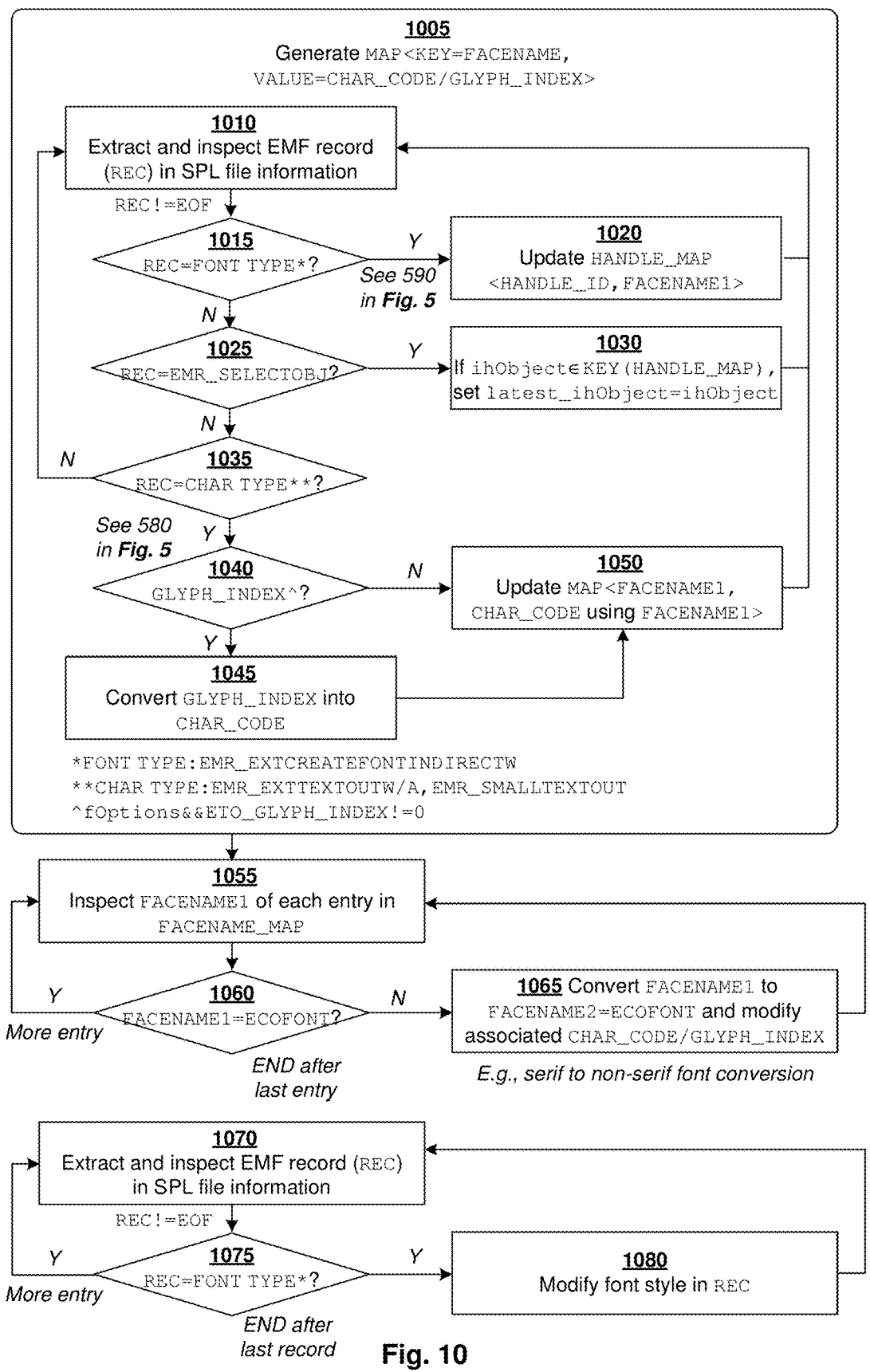
FIG. 10 is a flowchart of an example detailed process for a computer system to implement an economic printing mode with font information modification.

FIG. 10 is a flowchart of example detailed process 1000 for computer system 110 to implement an economic printing mode with font information modification. Example font information modification that includes modification of typename face will be explained using blocks 1010-1065 in FIG. 10. In this example, the following notations are used: FACENAME1=first typeface name, FACENAME2=second typeface name, CHAR_CODE/GLYPH_INDEX=a set of character codes or glyph indices. In typography, a glyph is a visual representation (e.g., shape) of a character when rendered or printed. A single typeface may include multiple glyphs for a single character. A glyph index identifies a glyph within a typeface, which includes a set of glyph indices. Each typeface may define a set of character codes (e.g., Unicode).

At 1010 in FIG. 10, EMF records may be extracted from the source printing content and inspected to generate a map of (key=FACENAME1, value=CHAR_CODE/GLYPH_INDEX). In more detail, at 1015-1020, in response to extracting and inspecting an EMF record type=font (e.g., EMR_EXTCREATEFONTINDIRECTW shown at 590 in FIG. 5) from the source printing content, a handle map (denoted as HANDLE_MAP) may be updated. For example, HANDLE_MAP may include entries specifying <key=HANDLE_ID, value=FACENAME1>, where HANDLE_ID=handle ID and FACENAME=typeface name associated with a logical font object. In practice, HANDLE_ID may be extracted from EMR_EXTCREATEFONTINDIRECTW, particularly attribute=ihFonts that specifies the index of a logical font object in an EMF object table.

At 1025-1030 in FIG. 10, in response to extracting EMF record=EMR_SELECTOBJECT and determination that HANDLE_MAP at block 1020 includes a corresponding ihObject (see ihObject ∈ KEY(HANDLE_MAP)), variable=latestihObject may be set to the ihObject. Here, variable=latestihObject records a handle ID associated with the latest selected font.

At 1035-1040 in FIG. 10, in response to extracting and inspecting an EMF record type=character (e.g., EMR_EXTTEXTOUTW/A, or EMR_SMALLTEXTOUT shown at 580 in FIG. 5) from the source printing content, it is determined whether glyph indices are used in the record, such as by determining whether fOptions and ETO_GLYPH_INDEX is non-zero (i.e., !=0). If yes (i.e., glyph indices are used), at 1045, glyph indices in the EMF record may be first converted to character codes. Otherwise, at 1050, a map is updated to add entry=<FACENAME1, CHAR_CODE/GLYPH_INDEX using FACENAME1>. Blocks 1010-1050 may be repeated for other EMF records to add all relevant entries into the map.

At 1055 in FIG. 10, each entry in the map of <FACENAME1, CHAR_CODE using FACENAME1> may be inspected. At 1060-65, in response to determination that FACENAME1 is not an economic font (denoted as ECOFONT), font conversion may be performed by converting FACENAME1 (e.g., Times New Roman) to FACENAME2=ECOFONT. Further, where necessary, the CHAR_CODE/GLYPH_INDEX may be modified to one associated with FACENAME2 instead of FACENAME1. Block 1065 ensures that FACENAME2 includes all characters in the source printing content. Note that the glyph index for the same character may be different for a different font name. Otherwise (i.e., ECOFONT already in use, the next entry the map is inspected until the last entry is encountered.

Depending on the desired implementation, FACENAME2=ECOFONT may be a sans-serif typeface that uses less ink compared to FACENAME1=serif typeface that has serifs (i.e., extra strokes on the ends of their letterforms). Alternatively or additionally, FACENAME2=ECOFONT may be a light face font that is designed to use less ink (e.g., smaller, lighter weight and more white space) but appears the same or substantially similar to commonly-used fonts, such as Arial, Verdana, Times New Roman, etc. Such conversion to a sans-serif typeface or light face font may provide incremental ink savings, especially on larger print jobs in mostly text-based documents.

(c) Font Style

Example font information modification that includes modification of font style will be explained using blocks 1070-1080 in FIG. 10. At 1070-1075, an EMF record may be extracted from the source printing content to determine whether its record type=font (e.g., EMR_EXTCREATEFONTINDIRECTW shown at 590 in FIG. 5). If yes, at 1075, a font style property may be updated to reduce ink consumption, such as by removing a bold setting, etc. Otherwise, the next record is extracted and inspected until the EMF EOF record is encountered.

Figure 11:
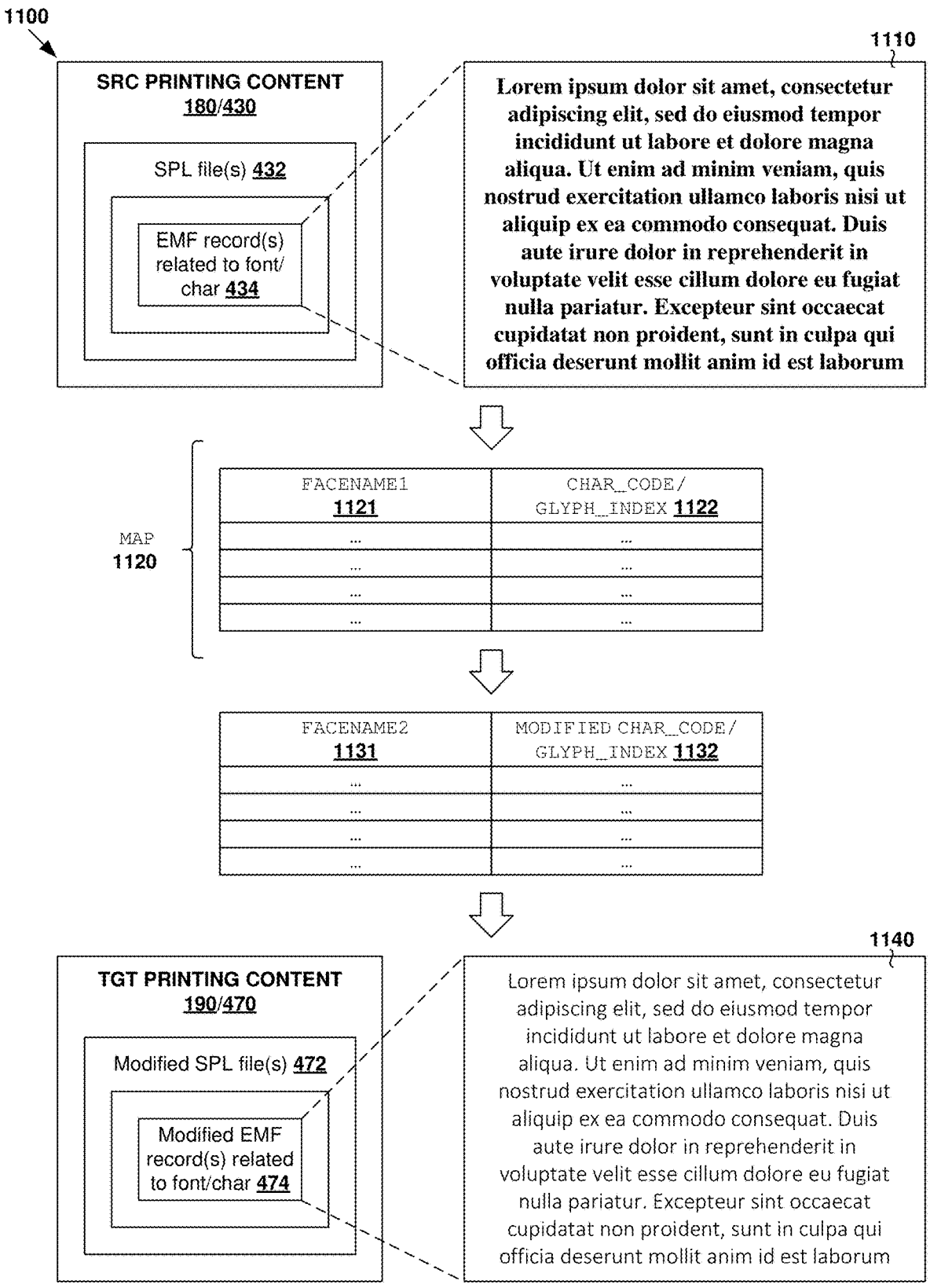
FIG. 11 is a schematic diagram illustrating an example of font information modification according to the example in FIG. 10.

An example is shown in FIG. 11, which is a schematic diagram illustrating example 1100 of font information modification according to the example in FIG. 10. In this example, example textual information 1100 extracted from source printing content 430 may be associated with FACENAME1, such as Times New Roman in a bold setting. To facilitate font information modification, a map of <key=FACENAME1, value =CHAR_CODE/GLYPH_INDEX may be generated (see 1120-1122). Next, FACENAME1 may be converted to FACENAME2 and associated CHAR_CODE/GLYPH_INDEX modified based on FACENAME2 (see 1131-1132).

An example result is shown at 1140 using FACENAME2 (e.g., Calibri Light) without bold setting, which appears lighter and therefore requires a lower ink consumption during printing. Target printing content 470 that includes modified EMF record(s) may then be sent to printer 130A for printing, or a preview may be generated using print previewer 113 prior to printing. Using examples of the present disclosure, automatic font information modification may be performed during printing to reduce ink consumption. Note that the font information in the original document(s) being printed is not modified.

Printing Ink Consumption Estimation

According to examples of the present disclosure, printing ink consumption associated with printing content may be estimated, such as to evaluate an economic printing mode described using the examples in FIGS. 1-11. In practice, printing ink consumption estimation may be performed for any suitable purpose, such as to evaluate the economic printing mode by comparing the amount of ink required for source printing content (i.e., before transformation) with the amount of ink required for target printing content (i.e., after transformation).

Figure 12:
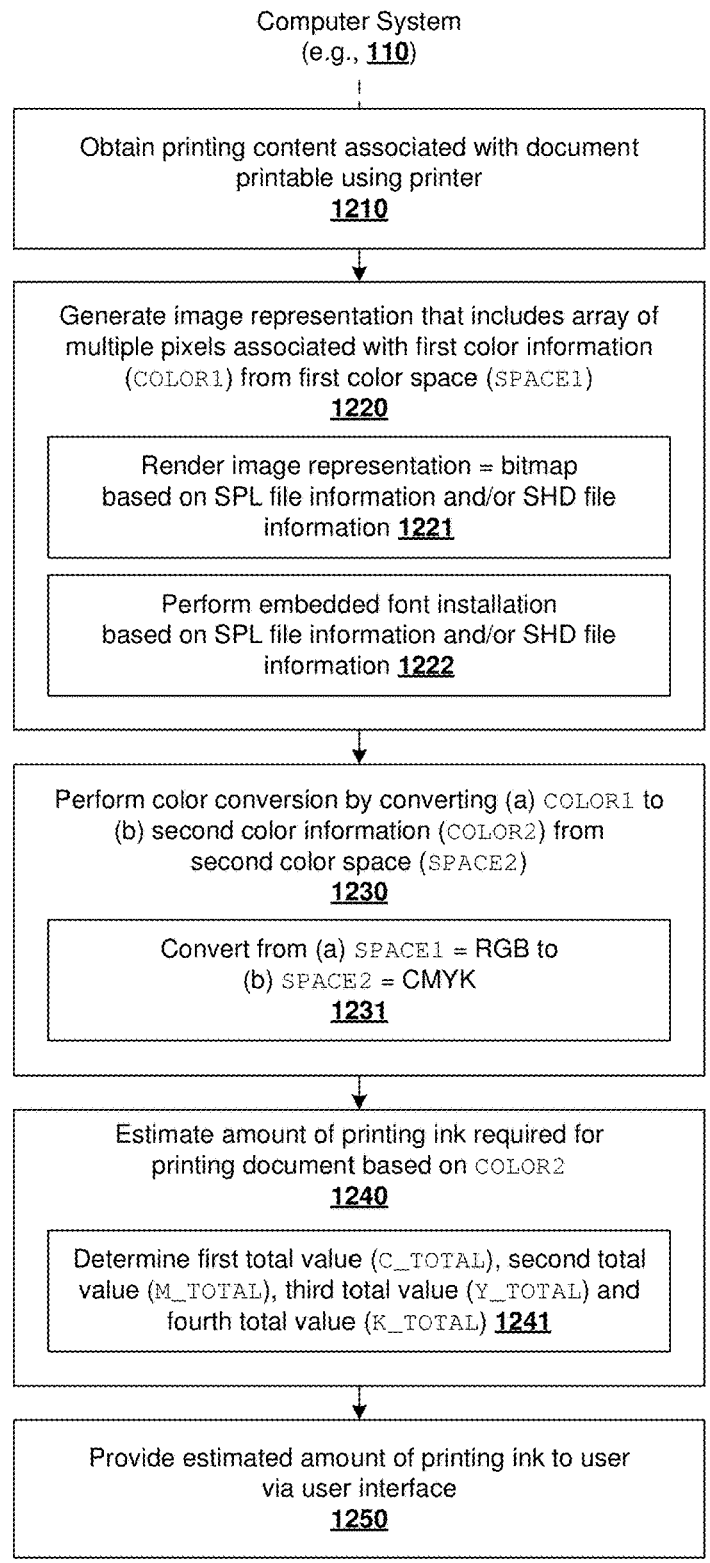
FIG. 12 is a flowchart of an example process for a computer system to implement printing ink consumption estimation.

In more detail, FIG. 12 is a flowchart of example process 1200 for a computer system to implement printing ink consumption estimation. Example process 1200 may include one or more operations, functions, or actions illustrated by one or more blocks, such as 1210 to 1250. Depending on the desired implementation, various blocks may be combined into fewer blocks, divided into additional blocks, and/or eliminated. The example in FIG. 12 will be discussed using FIG. 13, which is a schematic diagram illustrating example 1300 of printing ink consumption estimation. In the following, various examples will be discussed using computer system 110 and printer 130A in FIG. 1. In practice, any suitable computer system(s) and printer(s) outside of a virtual desktop application may be used.

At 1210 in FIG. 12, computer system 110 may obtain printing content associated with a document to be printed using printer 130A. In the example in FIG. 13, example printing content 1310 may be generated based on document 1305 (e.g., word processing document) to be printed. Using the VDI example in FIG. 1, printing content 1310 may be generated by print spooler 123 and processed by print processor 122 on server 120 before printing content 1310 (180 in FIG. 1) is sent towards computer system 110. Alternatively, in a non-VDI example where computer system 110 operates as a standalone system, printing content 1310 may be generated locally by print spooler 113. Similar to the examples in FIGS. 1-11, printing content 1310 may include SHD file information 1311 and SPL file information 1312.

At 1220 in FIG. 12, based on the printing content, computer system 110 may generate an image representation of the document that is printable using printer 130A. Here, the term "image representation" may refer generally to a visual representation in any suitable file format. Block 1220 may involve rendering a bitmap (i.e., image representation) based on EMF record(s) extracted from SPL file information and/or SHD file information, and where necessary, perform embedded font installation. See blocks 1221-1222 to be discussed further below using FIGS. 14-15.

Figure 13:
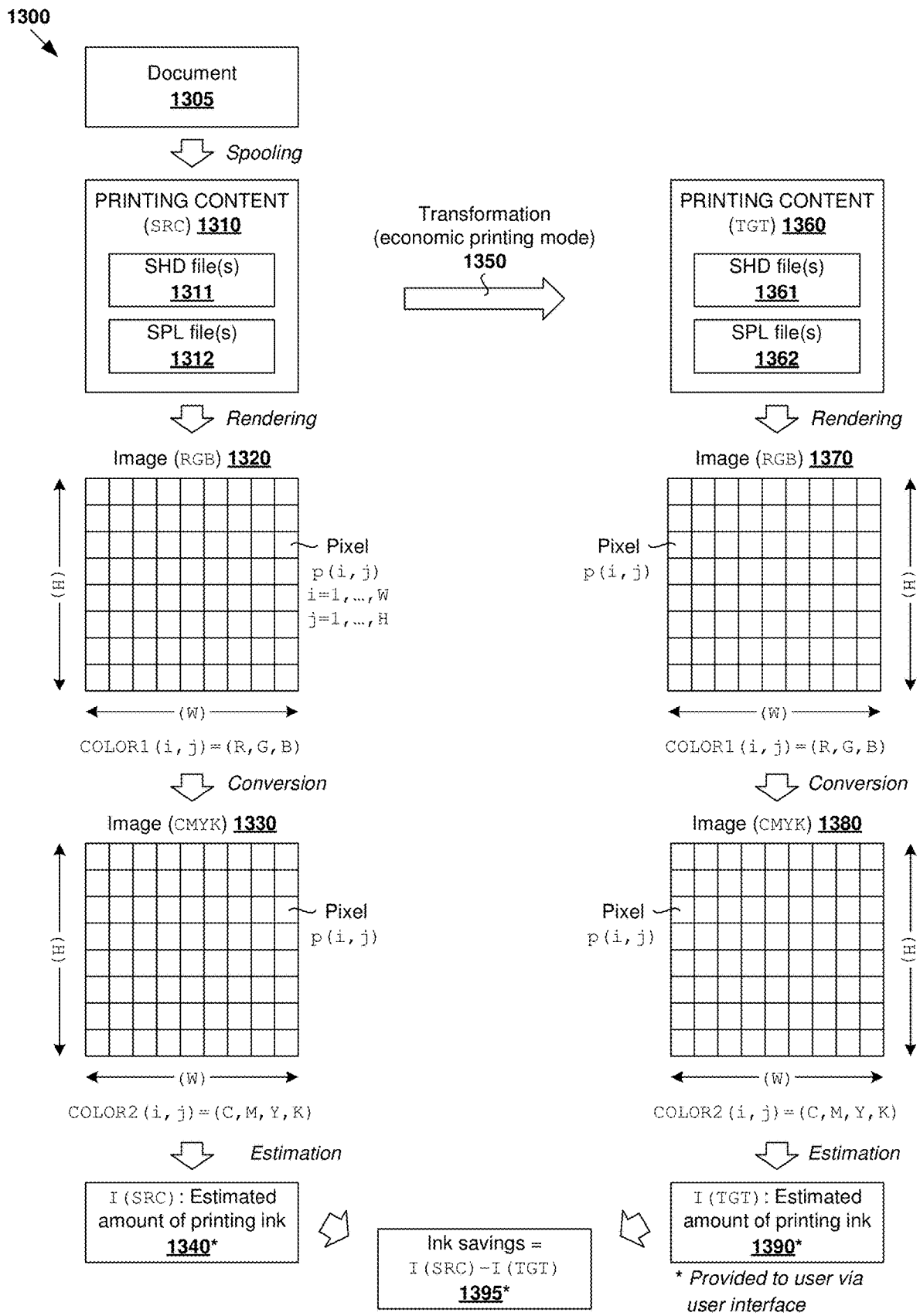
FIG. 13 is a schematic diagram illustrating an example of printing ink consumption estimation.

In the example in FIG. 13, bitmap 1320 may be rendered based EMF record(s) extracted from SPL file information 1312 and/or SHD file information 1311. Bitmap 1320 may include an array of multiple pixels associated with first color information (denoted as COLOR1) from a first color space (denoted as SPACE1), such as red, green and blue (RGB) color space that describes color information in terms of RGB intensities. RGB is often used for display on a display device (e.g., computer monitor).

At 1230 in FIG. 12, color conversion may be performed by converting (a) COLOR1 from SPACE1 to (b) second color information (denoted as COLOR2) from from a second color space (denoted as SPACE2) associated with printer 130A. In one example, the second color space may be cyan, magenta, yellow and key/black (CMYK) color space, which is often used by printers.

At 1240 in FIG. 12, computer system 110 may estimate an amount of printing ink required to print document 1305 based on the second color information from the second color space. It should be noted that the estimated amount is an estimation rather than an absolute or actual amount of printing ink that will be consumed.

At 1250 in FIG. 12, computer system 110 may provide the estimated amount to a user device via any suitable user interface. In the example in FIG. 13, printing ink consumption estimation 1341 may be presented to user 102 via first example user interface 1340. Some examples will be explained below using FIGS. 14-16.

(a) Bitmap Rendering

Figure 14:
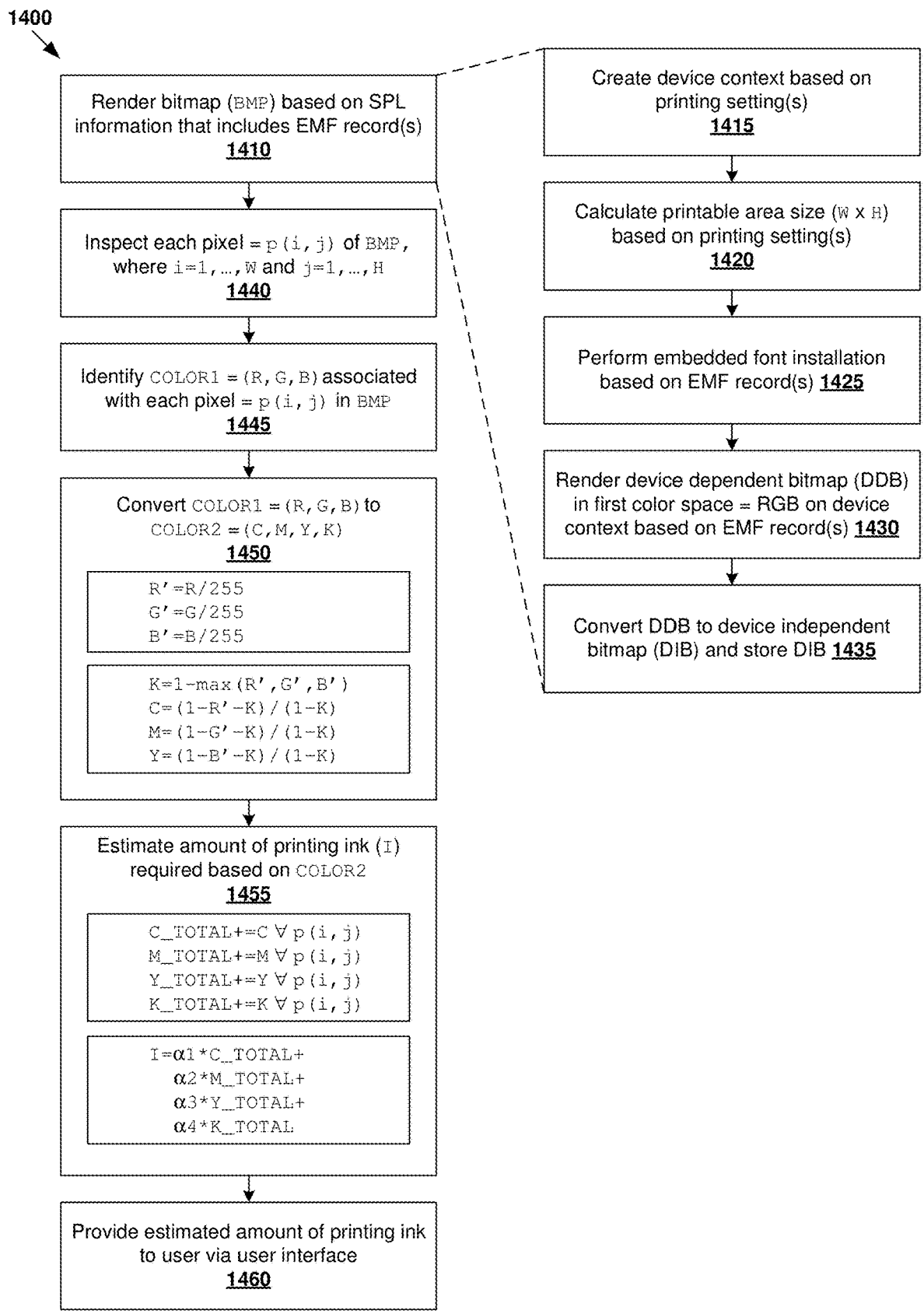
FIG. 14 is a flowchart of an example detailed process for a computer system to implement printing ink consumption estimation.

FIG. 14 is a flowchart of example detailed process 1400 for computer system 110 to implement printing ink consumption estimation. Example process 1400 may include one or more operations, functions, or actions illustrated by one or more blocks, such as 1410 to 1460. Depending on the desired implementation, various blocks may be combined into fewer blocks, divided into additional blocks, and/or eliminated.

At 1410 in FIG. 14, computer system 110 may render or generate an image representation of document 1305 based on SPL file information 1312 that includes EMF record(s). For example, an approach using a playback device context may be used to render bitmap 1320 based on the EMF record(s). Here, the playback device context may be a data structure that defines the state of graphics at any point in time during a playback. An example will be explained using blocks 1415-1430.

In more detail, at 1415 in FIG. 14, a playback device context may be created based on current printing setting(s), which may be extracted from SHD file information 1311 in printing content 1310. At 1420, a printable area may be calculated. For example, consider an A4 paper size is 210 mm by 297 mm (or 8.27 inches by 11.69 inches). Based on a printing setting in the form of print resolution=600 DPI, a 24-bit bitmap of having width (W)=4960 pixels by height (H)=7016 pixels may be rendered. In the example in FIG. 13, each pixel in the array (see 1320) may be denoted as $p(i, j)$, where $i=1, \ldots, W$ and $j=1, \ldots, H$.

At 1425 in FIG. 14, based on the EMF record(s), embedded font(s) may be installed. In practice, some third-party applications may generate some dependent font information associated with document 1305 to be printed. The installation may be performed in response to determination that there are embedded fonts in document 1305 and/or printing content 1310. An example implementation of embedded font installation will be described using FIG. 15 below.

At 1430 in FIG. 14, based on the EMF record(s) a device-dependent bitmap (DDB) may be rendered on the playback device context created at block 1415. At 1435, the DIB may be converted to a device-independent bitmap (DIB), which is then stored for subsequent processing.

At 1440-1450 in FIG. 14, for every pixel=$p(i, j)$ in the bitmap, a first color value from SPACE1=RGB may be converted to a second color value from SPACE2=CMYK. In the example in FIG. 13, the RGB color value associated with each pixel $p(i, j)$ may be denoted as COLOR1$(i,j)$=(R, G, B), where R=red intensity value, G=green intensity value and B=blue intensity value associated with $p(i, j)$. Each intensity value ranges from 0 to 255 (i.e., 8 bits). For example, black=(0, 0, 0), white=(255, 255, 255), red=(255, 0, 0), green=(0, 255, 0) and blue=(0, 0, 255).

In one example, the conversion process may involve dividing the (R,G,B) values by 255 to change the range from [0, 255] to [0, 1]. The result is denoted as (R', G', B'), where R'=red intensity value, G'=green intensity value and B'=blue intensity value that range from 0 to 1. Next, (R', G', B') may be converted into COLOR2$(i,j)$=(C, M, Y, K) from SPACE2=CMYK. For example, the black key color value may be K=1—max(R', G', B'). The cyan color value may be C=(1—R'—K)/(1—K). The magenta color value may be M=(1—G'—K)/(1—K). The yellow color may be Y=(1—B'—K)/(1—K). See example conversion from COLOR1$(i,j)$=(R, G, B) 1320 to COLOR2$(i, j)$=(C, M, Y, K) 1330 in FIG. 13.

(b) Estimation

At 1455 in FIG. 14, an amount of printing ink required (denoted as I) may be estimated based on second color information COLOR2$(i, j)$=(C, M, Y, K). Block 1455 may include calculating total CMYK color intensity values ($C_{total}$, $M_{total}$, $Y_{total}$, $K_{total}$) as a sum of respective (C,M,Y,K) color values for all pixels $p(i, j)$, where $i=1, \ldots, W$ and $j=1, \ldots, H$.

For example, a first total value (i.e., total cyan color intensity) may be determined as $C_{total}+=C$ based on the sum of multiple cyan color values of all pixels p(i, j). A second total value (i.e., total magenta color intensity) may be determined as $M_{total}+=M$ based on the sum of multiple magenta color values of all pixels p(i, j). A third total value (i.e., total yellow color intensity) may be determined as $Y_{total}+=Y$ based on the sum of multiple yellow color values of all pixels p(i, j). A fourth total value (i.e., total key color intensity) may be determined as $K_{total}+=K$ based on the sum of multiple key color values of all pixels p(i, j).

Next, printing ink consumption (denoted as I) for printing document 1305 may be estimated based on the total CMYK color intensity values ($C_{total}$, $M_{total}$, $Y_{total}$, $K_{total}$) At 1465, the estimated printing ink consumption (I) may be provided to user 102 via any suitable user interface. Depending on the desired implementation, the estimation may involve calculating the following (e.g., $\alpha_1=\alpha_2=\alpha_3=\alpha_4=1$).

$$I=\alpha_1*C_{total}+\alpha_2*M_{total}+\alpha_3*Y_{total}+\alpha_4*K_{total}.$$

(c) Embedded Font Installation

Figure 15:
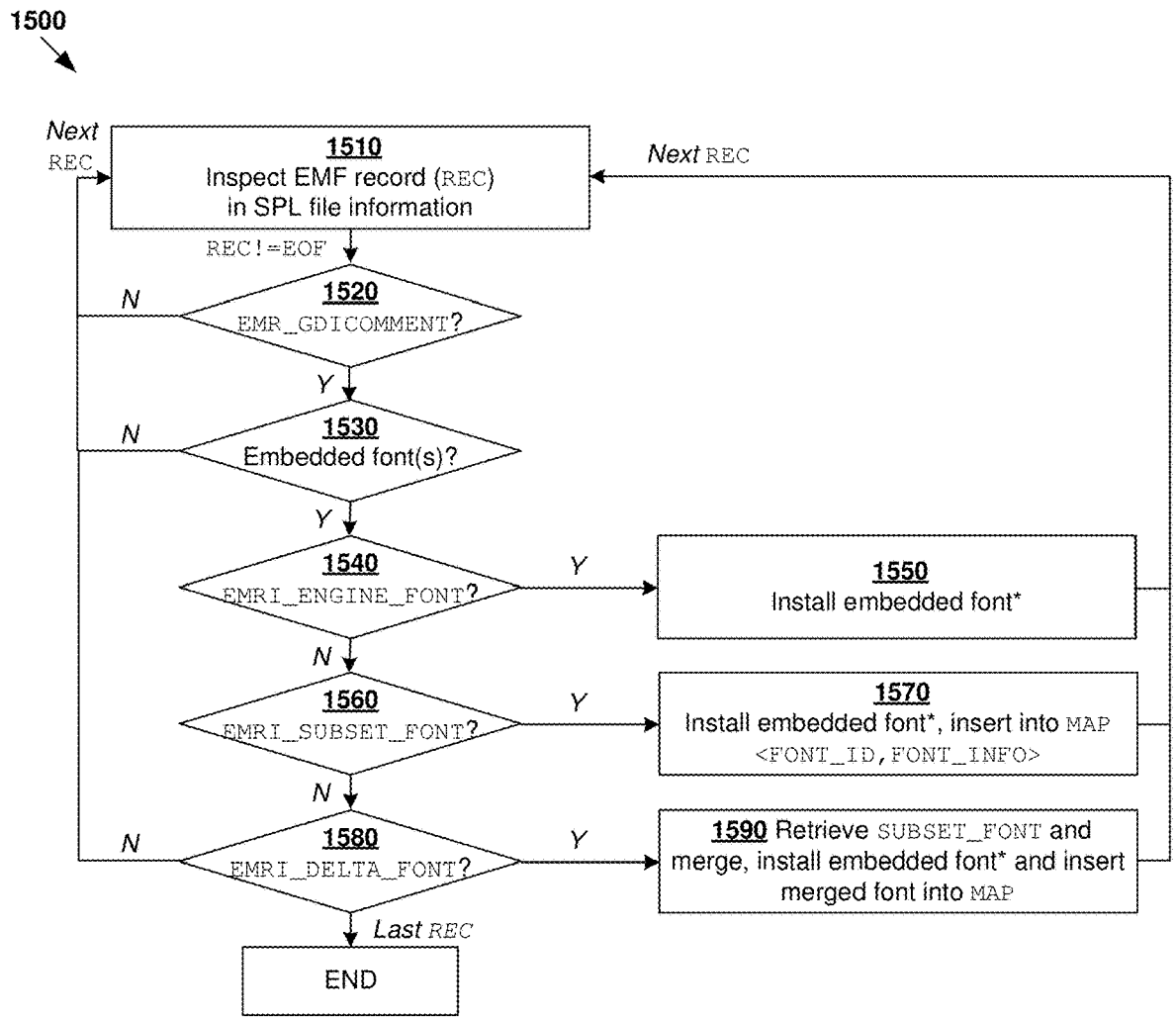
FIG. 15 is a flowchart of an example detailed process for a computer system to implement embedded font installation during printing ink consumption estimation.
Figure 15:
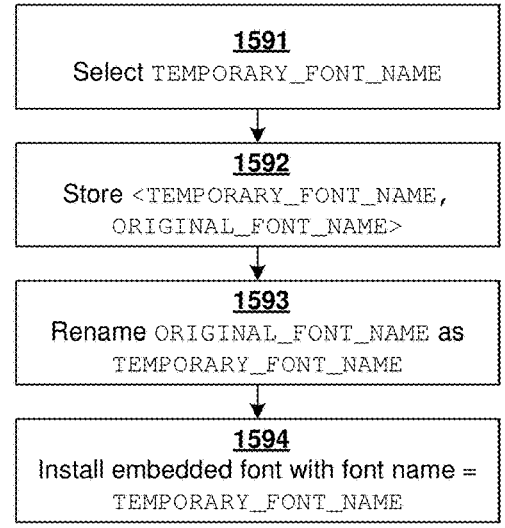

FIG. 15 is a flowchart of example detailed process 1500 for computer system 110 to implement embedded font installation during printing ink consumption estimation. Example process 1500 may include one or more operations, functions, or actions illustrated by one or more blocks, such as 1510 to 1594. Depending on the desired implementation, various blocks may be combined into fewer blocks, divided into additional blocks, and/or eliminated.

In general, fonts that require installation may have a name conflict, which may result in incorrect installation that leads to incorrect rendering of these fonts. To reduce the likelihood of incorrect installation, a temporary font name that is unique to a particular print job may be randomly selected. The temporary font name may be set to the same length as the original font name such that it is not necessary to reconstruct the font information.

For example, consider a scenario where document 1305 in FIG. 13 includes two pages to be oriented. Both pages may depend on font A. The first page may use a subset font named A, while the second page uses a delta font based on the subset font on the first page. Before the first page is printed, subset font A may be installed. Before the second page is printed, the delta font may be merged with the subset font A on the first page. To reduce the likelihood of font installation conflict, one intuition is to remove the subset font A before performing the merge. However, in practice, this may be problematic for print preview and/or printing using some eXtensible Markup Language (XML) Paper Specification (XPS) printers.

According to examples of the present disclosure, a temporary font name that is unique to particular print job (i.e., no other font used has the same name) may be used for subset font A. To facilitate the renaming, a corresponding logical font record may be updated to replace the original font name with the temporary one. The length of the temporary font name may be the same as the original to reduce the number of changes required to the logical font record. To generate the temporary name with the same length as the original, an algorithm based on a uniform distribution may be used.

At 1510 in FIG. 5, an EMF record may be extracted from printing content 1310 and inspected. At 1520, a data structure called EMRGDICOMMENT may be inspected to determine whether there is any application-specific embedded font information associated with dependent/embedded fonts. In practice, some applications (e.g., Microsoft® Edge) may generate information associated with dependent fonts for a document to be printed. Such information may be extracted from printing content 1310 to facilitate embedded font installation.

At 1530 in FIG. 15, in response to determination to that the EMR_GDICOMMENT data structure specifies embedded font information, it is determined whether the record is one of the following: EMRI_ENGINE_FONT, EMRI_SUBSET_FONT and EMRI_DELTA_FONT.

In particular, at 1540-1550 in FIG. 15, in response to determination that the record type=EMRI_ENGINE_FONT, embedded font installation may be performed based on the record. The EMRI_ENGINE_FONT record may include embedded TrueType fonts. In practice, TrueType is a scalable font technology that renders fonts for both the printer and the screen. Each TrueType font may include algorithm(s) for converting printer outlines into screen bitmaps. A TrueType font is designed to be scalable to any size and may be sent to any printer or other output device.

At 1560-1570 in FIG. 15, in response to determination that the record type=EMRI_SUBSET_FONT, embedded font installation may be performed based on the record. The EMRI_SUBSET_FONT record may include a subset of TrueType and OpenType fonts, which may be merged to form more complete fonts. Further, block 1540 may involve updating a map by adding entry <FONT_ID, FONT_INFO> associated with the font.

At 1580-1590 in FIG. 15, in response to determination that the record type=EMRI_DELTA_FONT, an associated (preceding) EMRI_SUBSET_FONT record may be retrieved and merged with the delta font. The EMRI_DELTA_FONT record may include partial TrueType and OpenType fonts, which may be merged to form more complete fonts. The EMRI_DELTA_FONT record may define new glyphs to be merged with a preceding EMRI_SUBSET_FONT record. Block 1590 may further involve embedded font installation and inserting merged font into the map by adding entry <FONT_ID, FONT_INFO> associated with the font.

Depending on the desired implementation, embedded font installation at block 1550/1570/1590 may further include blocks 1591-1594. In particular, block 1591 may involve selecting a temporary font name for an embedded font to be installed. Block 1592 may involve storing mapping information <TEMPORARY_FONT_NAME, ORIGINAL_FONT_NAME>. Block 1593 may involve renaming the original font name as the temporary font name, such as updating the font name property in the EMR_EXTCREATEFONTINDIRECTW record, etc. Block 1594 may involve installing the embedded font with using TEMPORARY_FONT_NAME.

Economic Printing Mode Evaluation

Referring to FIG. 13 again, printing ink consumption estimation may be implemented to evaluate an economic printing mode according to examples of the present disclosure. In this example, at 1310-1340, printing ink consumption estimation may be performed based on source printing content 1310. In more detail, at 1320, a bitmap with first color information COLOR1(i,j)=(R, G, B) may be rendered based on source printing content 1310. Next, at 1330, color conversion may be performed to convert the first color information to second color information COLOR2(i, j)=(C, M, Y, K) in CMYK color space for all pixels p(i, j). This way, at 1340, a first amount of printing ink associated with source printing content 1310 may be estimated.

At 1350 in FIG. 13, source printing content 1310 may be transformed to generate target printing content 1360 based on one or more of the following selectable levels of an economic printing mode: (a) a first level associated with print quality reduction; (b) a second level associated with image information transformation and (c) a third level associated with font information modification.

At 1360-1390 in FIG. 13, printing ink consumption estimation may be performed based on target printing content 1360. In more detail, at 1370, a bitmap with first color information COLOR1(i,j)=(R, G, B) may be rendered based on target printing content 1360. Next, at 1380, color conversion may be performed to convert the first color information to second color information COLOR2(i, j)=(C, M, Y, K) in CMYK color space for all pixels p(i, j). This way, at 1390, a second amount of printing ink associated with target printing content 1360 may be estimated.

At 1395 in FIG. 13, ink savings may be estimated by comparing (a) first estimated amount of printing ink 1340 (i.e., original) with (b) second estimated amount of printing ink 1390 (i.e., economic printing mode applied). Results of the evaluation that includes first estimated amount 1340, second estimated amount 1390 and ink savings 1395 may be provided to user 102 via a user interface.

Figure 16:
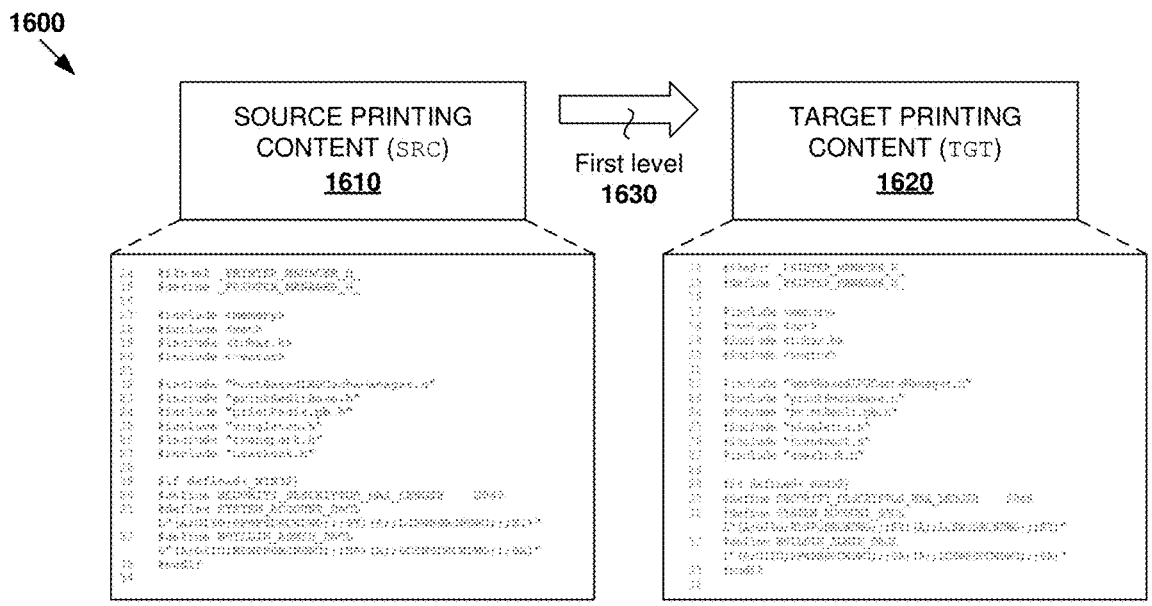
FIG. 16 is a schematic diagram illustrating an example evaluation of an economic printing mode.
Figure 16:
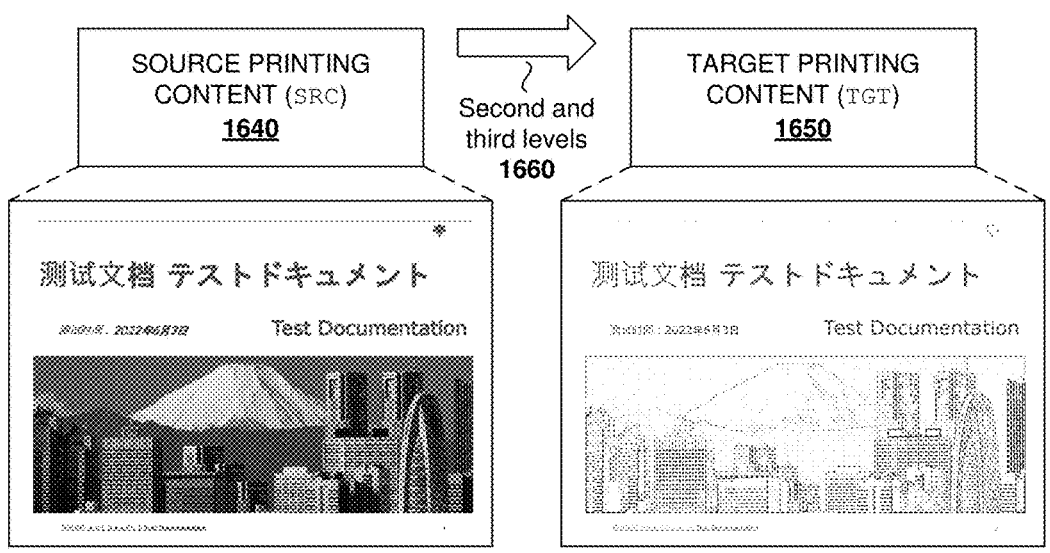

FIG. 16 is a schematic diagram illustrating an example evaluation of an economic printing mode according to examples of the present disclosure. In a first example, a first level of the economic printing mode (see 1630) may be implemented to transform source printing content 1610 into target printing content 1620. In particular, print quality reduction may be performed by reducing original print resolution=600 DPI associated with source printing content 1610 to 300 DPI. At 1640, ink savings=68.1% may be estimated by comparing (a) a first estimated amount of printing ink associated with source printing content 1610 with (b) a second estimated amount of printing ink associated with target printing content 1620. As described using FIGS. 12-15, the estimation may be performed based on total color intensity values ($C_{total}$, $M_{total}$, $Y_{total}$, $K_{total}$) in CMYK color space.

In a second example, second and third levels of the economic printing mode (see 1660) may be implemented to transform source printing content 1640 to generate target printing content 1650. In particular, the second level is associated with image information transformation and the third level with font information modification to reduce ink consumption. At 1670, ink savings=60.15% may be estimated by comparing (a) a first estimated amount of printing ink associated with source printing content 1640 with (b) a second estimated amount of printing ink associated with target printing content 1650.

Physical System(s)

As described using FIG. 1, computer system 110 may act as a client system for user 102 to access virtual desktop 125 supported by server 120. Depending on the desired implementation, virtual desktop 125 may be implemented using virtual machine(s) supported by server 120. In the following, example server computer systems will be explained using hosts 1710A-B, and VMs using VMs 1731-1734.

Figure 17:
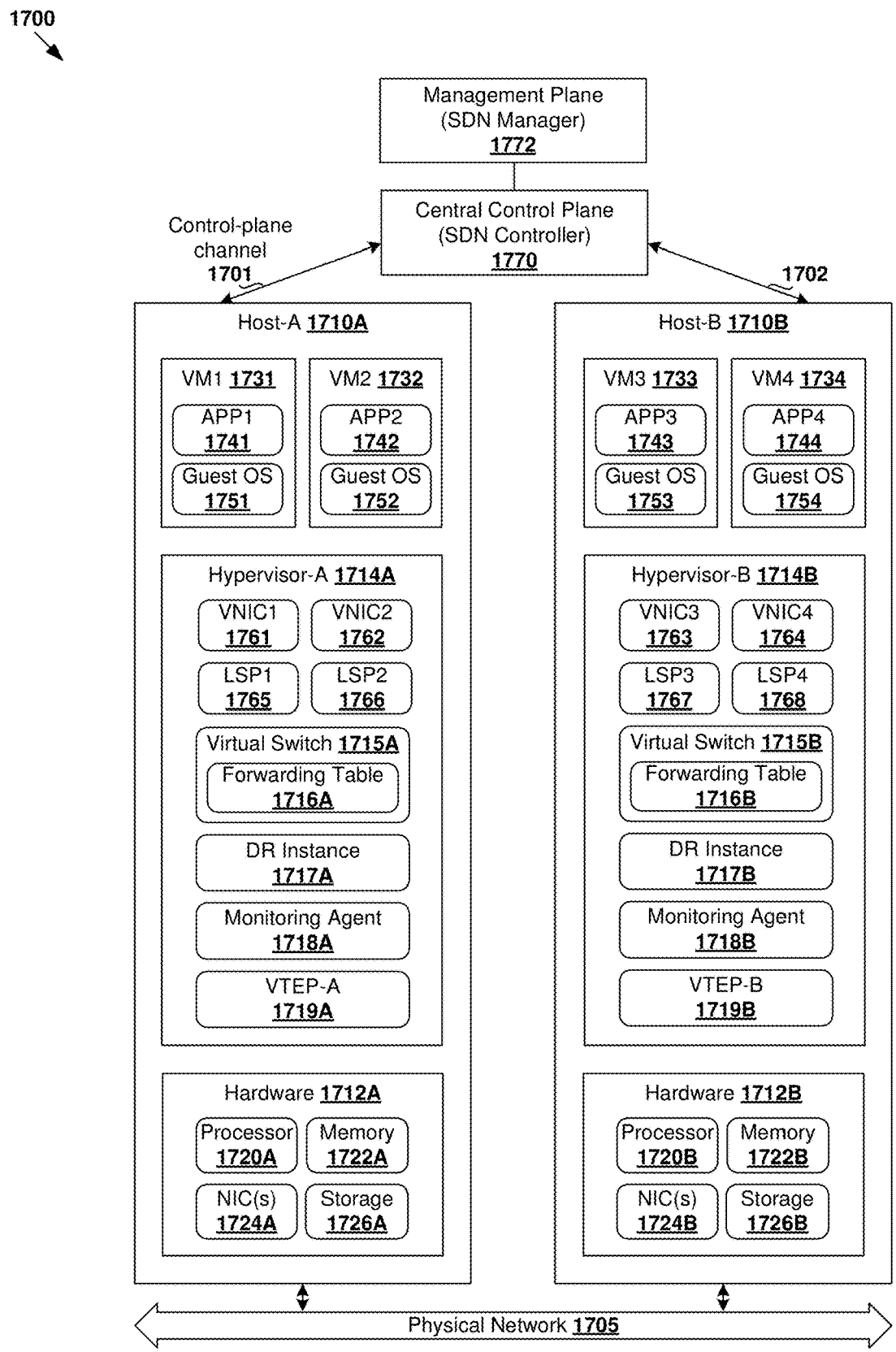
FIG. 17 is a schematic diagram illustrating an example physical view of hosts in a software-defined networking (SDN) environment.

In more detail, FIG. 17 which is a schematic diagram illustrating an example physical view of hosts in a software-defined networking (SDN) environment 1700. It should be understood that, depending on the desired implementation, SDN environment 1700 may include additional and/or alternative components than that shown in FIG. 17. In practice, SDN environment 1700 may include any number of hosts (also known as "computer systems," "computing devices", "host computers", "host devices", "physical servers", "server systems", "transport nodes," etc.).

SDN environment 1700 may include host-A 1710A as well as other hosts, such as host 1710B. Host 1710A/1710B may include suitable hardware 1712A/1712B and virtualization software (e.g., hypervisor-A 1714A, hypervisor-B 1714B) to support various VMs. For example, host-A 1710A may support VM1 1731 and VM2 1732, while VM3 1733 and VM4 1734 are supported by host-B 1710B. Hardware 1712A/1712B includes suitable physical components, such as central processing unit(s) (CPU(s)) or processor(s) 1720A/1720B; memory 1722A/1722B; physical network interface controllers (PNICs) 1724A/1724B; and storage disk(s) 1726A/1726B, etc.

Hypervisor 1714A/1714B maintains a mapping between underlying hardware 1712A/1712B and virtual resources allocated to respective VMs. Virtual resources are allocated to respective VMs 1731-1734 to support a guest operating system (OS; not shown for simplicity) and application(s); see 1741-1744, 1751-1754. For example, the virtual resources may include virtual CPU, guest physical memory, virtual disk, virtual network interface controller (VNIC), etc. Hardware resources may be emulated using virtual machine monitors (VMMs). For example in FIG. 17, VNICs 1761-1764 are virtual network adapters for VMs 1731-1734, respectively, and are emulated by corresponding VMMs (not shown) instantiated by their respective hypervisor at respective host-A 1710A and host-B 1710B.

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 1714A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-17" may refer generally to a link layer or media access control (MAC) layer; "layer-3" a network or Internet Protocol (IP) layer; and "layer-4" a transport layer (e.g., using Transmission Control Protocol (TCP), User Datagram Protocol (UDP), etc.), in the Open System Interconnection (OSI) model, although the concepts described herein may be used with other networking models.

SDN controller 1770 and SDN manager 1772 are example network management entities in SDN environment 1700. One example of an SDN controller is the NSX controller component of VMware NSX® (available from VMware, Inc.) that operates on a central control plane. SDN controller 1770 may be a member of a controller cluster (not shown for simplicity) that is configurable using SDN manager 1772. Network management entity 1770/1772 may be implemented using physical machine(s), VM(s), or both. To send or receive control information, a local control plane (LCP) agent (not shown) on host 1710A/1710B may interact with SDN controller 1770 via control-plane channel 1701/1702.

Through virtualization of networking services in SDN environment 1700, logical networks (also referred to as overlay networks or logical overlay networks) may be provisioned, changed, stored, deleted and restored programmatically without having to reconfigure the underlying physical hardware architecture. Hypervisor 1714A/1714B implements virtual switch 1715A/1715B and logical distributed router (DR) instance 1717A/1717B to handle egress packets from, and ingress packets to, VMs 1731-1734. In SDN environment 1700, logical switches and logical DRs may be implemented in a distributed manner and can span multiple hosts.

For example, a logical switch (LS) may be deployed to provide logical layer-17 connectivity (i.e., an overlay network) to VMs 1731-1734. A logical switch may be implemented collectively by virtual switches 1715A-B and represented internally using forwarding tables 1716A-B at respective virtual switches 1715A-B. Forwarding tables 1716A-B may each include entries that collectively implement the respective logical switches. Further, logical DRs that provide logical layer-3 connectivity may be implemented collectively by DR instances 1717A-B and represented internally using routing tables (not shown) at respective DR instances 1717A-B. Each routing table may include entries that collectively implement the respective logical DRs.

Packets may be received from, or sent to, each VM via an associated logical port. For example, logical switch ports 1765-1768 (labelled "LSP1" to "LSP4") are associated with respective VMs 1731-1734. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 1715A-B, whereas a "virtual switch" may refer generally to a software switch or software implementation of a physical switch. In practice, there is usually a one-to-one mapping between a logical port on a logical switch and a virtual port on virtual switch 1715A/1715B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

A logical overlay network may be formed using any suitable tunneling protocol, such as Virtual eXtensible Local Area Network (VXLAN), Stateless Transport Tunneling (STT), Generic Network Virtualization Encapsulation (GENEVE), Generic Routing Encapsulation (GRE), etc. For example, VXLAN is a layer-17 overlay scheme on a layer-3 network that uses tunnel encapsulation to extend layer-17 segments across multiple hosts which may reside on different layer 17 physical networks. Hypervisor 1714A/1714B may implement virtual tunnel endpoint (VTEP) 1719A/1719B to encapsulate and decapsulate packets with an outer header (also known as a tunnel header) identifying the relevant logical overlay network (e.g., VNI). Hosts 1710A-B may maintain data-plane connectivity with each other via physical network 1705 to facilitate east-west communication among VMs 1731-1734.

Hosts 1710A-B may also maintain data-plane connectivity with cluster 110 of multiple (M) EDGE nodes 111-11M in FIG. 17 via physical network 1705 to facilitate north-south traffic forwarding, such as between a VM (e.g., VM1 1731) and remote destination 104 at a different geographical site. Various examples for the case of M=3 will be described throughout the present disclosure. In practice, each EDGE node may be an entity that is implemented using one or more virtual machines (VMs) and/or physical machines (known as "bare metal machines") and capable of performing functionalities of a switch, router, bridge, gateway, edge appliance, etc. Each EDGE node may implement a logical service router (SR) to provide networking services, such as gateway service, domain name system (DNS) forwarding, IP address assignment using dynamic host configuration protocol (DHCP), source network address translation (SNAT), destination NAT (DNAT), deep packet inspection, etc. When acting as a gateway, an EDGE node may be considered to be an exit point to an external network.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 17.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method for a computer system to perform printing ink consumption estimation, wherein the method comprises:
    obtaining printing content associated with a document that is printable using a printer;
    based on the printing content, generating an image representation of the document, wherein the image representation includes an array of multiple pixels associated with first color information from a first color space;
    performing color conversion by converting (a) the first color information from the first color space to (b) second color information from a second color space associated with the printer;
    estimating an amount of printing ink required for printing the document based on the second color information from the second color space; and
    providing the estimated amount of printing ink to a user via a user interface.

2. The method of claim 1, wherein performing the color conversion comprises:
    converting from (a) the first color space in the form of red, green and blue (RGB) color space to (b) the second color space in the form of cyan, magenta, yellow and key (CMYK) color space.

3. The method of claim 2, wherein estimating the amount of printing ink comprises:
    determining a first total value based on multiple cyan color values from the second color information;
    determining a second total value based on multiple magenta color values from the second color information;
    determining a third total value based on multiple yellow color values from the second color information;
    determining a fourth total value based on multiple key color values from the second color information; and
    estimating the amount of printing ink based on the first total value, second total value, third total value and fourth total value.

4. The method of claim 1, wherein generating the image representation comprises:
    rendering a bitmap represented by the array of pixels based on the printing content that includes spool file information in enhanced metafile (EMF) format.

5. The method of claim 4, wherein generating the image representation comprises:
    based on one or more print settings, determining a printable area size associated with the document; and
    rendering the bitmap using a playback device context based on the printable area size.

6. The method of claim 1, wherein generating the image representation comprises:
    in response to determination that the printing content includes an embedded font, installing the embedded font prior to rendering the bitmap, wherein a temporary font name is assigned to the embedded font during installation.

7. The method of claim 1, wherein estimating the amount of printing ink required comprises:
    estimating the amount of printing ink required to evaluate an economic printing mode that is implemented to generate the printing content, being target printing content, by transforming source printing content based on one or more of the following levels of the economic printing mode: (a) a first level associated with print quality reduction; (b) a second level associated with image information and (c) a third level associated with textual information.

8. A non-transitory computer-readable storage medium that includes a set of instructions which, in response to execution by a processor of a computer system, cause the processor to perform a method of printing ink consumption estimation, wherein the method comprises:
    obtaining printing content associated with a document that is printable using a printer;
    based on the printing content, generating an image representation of the document, wherein the image representation includes an array of multiple pixels associated with first color information from a first color space;
    performing color conversion by converting (a) the first color information from the first color space to (b) second color information from a second color space associated with the printer;
    estimating an amount of printing ink required for printing the document based on the second color information from the second color space; and
    providing the estimated amount of printing ink to a user via a user interface.

9. The non-transitory computer-readable storage medium of claim 8, wherein performing the color conversion comprises:
    converting from (a) the first color space in the form of red, green and blue (RGB) color space to (b) the second color space in the form of cyan, magenta, yellow and key (CMYK) color space.

10. The non-transitory computer-readable storage medium of claim 9, wherein estimating the amount of printing ink comprises:
    determining a first total value based on multiple cyan color values from the second color information;
    determining a second total value based on multiple magenta color values from the second color information;
    determining a third total value based on multiple yellow color values from the second color information;
    determining a fourth total value based on multiple key color values from the second color information; and
    estimating the amount of printing ink based on the first total value, second total value, third total value and fourth total value.

11. The non-transitory computer-readable storage medium of claim 8, wherein generating the image representation comprises:
rendering a bitmap represented by the array of pixels based on the printing content that includes spool file information in enhanced metafile (EMF) format.

12. The non-transitory computer-readable storage medium of claim 11, wherein generating the image representation comprises:
based on one or more print settings, determining a printable area size associated with the document; and
rendering the bitmap using a playback device context based on the printable area size.

13. The non-transitory computer-readable storage medium of claim 8, wherein generating the image representation comprises:
in response to determination that the printing content includes an embedded font, installing the embedded font prior to rendering the bitmap, wherein a temporary font name is assigned to the embedded font during installation.

14. The non-transitory computer-readable storage medium of claim 8, wherein estimating the amount of printing ink required comprises:
estimating the amount of printing ink required to evaluate an economic printing mode that is implemented to generate the printing content, being target printing content, by transforming source printing content based on one or more of the following levels of the economic printing mode: (a) a first level associated with print quality reduction; (b) a second level associated with image information and (c) a third level associated with textual information.

15. A computer system, comprising:
a processor; and
a non-transitory computer-readable medium having stored thereon instructions that, when executed by the processor, cause the processor to perform the following:
obtain printing content associated with a document that is printable using a printer;
based on the printing content, generate an image representation of the document, wherein the image representation includes an array of multiple pixels associated with first color information from a first color space;
perform color conversion by converting (a) the first color information from the first color space to (b) second color information from a second color space associated with the printer;
estimate an amount of printing ink required for printing the document based on the second color information from the second color space; and
provide the estimated amount of printing ink to a user via a user interface.

16. The computer system of claim 15, wherein the instructions for performing the color conversion comprises:
convert from (a) the first color space in the form of red, green and blue (RGB) color space to (b) the second color space in the form of cyan, magenta, yellow and key (CMYK) color space.

17. The computer system of claim 16, wherein the instructions for estimating the amount of printing ink cause the processor to:
determine a first total value based on multiple cyan color values from the second color information;
determine a second total value based on multiple magenta color values from the second color information;
determine a third total value based on multiple yellow color values from the second color information;
determine a fourth total value based on multiple key color values from the second color information; and
estimate the amount of printing ink based on the first total value, second total value, third total value and fourth total value.

18. The computer system of claim 15, wherein the instructions for generating the image representation cause the processor to:
render a bitmap represented by the array of pixels based on the printing content that includes spool file information in enhanced metafile (EMF) format.

19. The computer system of claim 18, wherein the instructions for generating the image representation cause the processor to:
based on one or more print settings, determine a printable area size associated with the document; and
render the bitmap using a playback device context based on the printable area size.

20. The computer system of claim 15, wherein the instructions for generating the image representation cause the processor to:
in response to determination that the printing content includes an embedded font, install the embedded font prior to rendering the bitmap, wherein a temporary font name is assigned to the embedded font during installation.

21. The computer system of claim 15, wherein the instructions for estimating the amount of printing ink required cause the processor to:
estimate the amount of printing ink required to evaluate an economic printing mode that is implemented to generate the printing content, being target printing content, by transforming source printing content based on one or more of the following levels of the economic printing mode: (a) a first level associated with print quality reduction; (b) a second level associated with image information and (c) a third level associated with textual information.

* * * * *